US012649378B2

(12) United States Patent　　　　(10) Patent No.:　US 12,649,378 B2

Hirano et al.　　　　　　　　　　　(45) Date of Patent:　　Jun. 9, 2026

(54) WIRELESS POWER TRANSFER SYSTEM, VEHICLE, SERVER, AND POWER TRANSMISSION DEVICE

(71) Applicant: TOYOTA JIDOSHA KABUSHIKI KAISHA, Toyota (JP)

(72) Inventors: Takahiro Hirano, Gotemba (JP); Shogo Tsuge, Fuji (JP); Ryosuke Ikemura, Susono (JP); Yohei Arino, Nagoya (JP); Masaki Ito, Toyota (JP); Yuki Takahashi, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 892 days.

(21) Appl. No.: 17/818,735

(22) Filed: Aug. 10, 2022

(65) Prior Publication Data

US 2023/0057789 A1　　Feb. 23, 2023

(30) Foreign Application Priority Data

Aug. 20, 2021　　(JP) ................................. 2021-135059

(51) Int. Cl.
| | |
|---|---|
| *B60L 53/39* | (2019.01) |
| *B60L 53/122* | (2019.01) |
| *B60L 53/37* | (2019.01) |
| *H02J 50/10* | (2016.01) |
| *H02J 50/40* | (2016.01) |

(52) U.S. Cl.
CPC ............. *B60L 53/39* (2019.02); *B60L 53/122* (2019.02); *B60L 53/37* (2019.02); *H02J 50/10* (2016.02); *H02J 50/40* (2016.02)

(58) Field of Classification Search
CPC ........................................................ H02J 50/60

USPC .......................................................... 320/108
See application file for complete search history.

(56) References Cited

U.S. PATENT DOCUMENTS

| | | | | |
|---|---|---|---|---|
| 9,983,300 | B2 * | 5/2018 | Sieber ..................... | G01S 13/04 |
| 2012/0200151 | A1 | 8/2012 | Obayashi et al. | |
| 2014/0092243 | A1 * | 4/2014 | Ichikawa ................ | B60L 50/61 |
| | | | | 307/104 |
| 2016/0248271 | A1 * | 8/2016 | Amari ..................... | H02J 50/12 |
| 2020/0156488 | A1 * | 5/2020 | Tsukamoto ............. | H02J 50/10 |
| 2025/0149926 | A1 * | 5/2025 | Sumiya ................. | H02J 50/402 |

FOREIGN PATENT DOCUMENTS

JP　　　　2012-165497 A　　8/2012

* cited by examiner

*Primary Examiner* — Ahmed H Omar
(74) *Attorney, Agent, or Firm* — Finnegan, Henderson, Farabow, Garrett and Dunner, LLP

(57)　　　　　ABSTRACT

A wireless power transfer system includes a first power transmission unit, a second power transmission unit, a power reception unit, a sensing unit, and an ECU. The first power transmission unit is provided in a parking space. The second power transmission unit is provided in a traveling lane for a vehicle. The sensing unit senses a sensing target in a sensing region set around the vehicle. When the sensing unit senses the sensing target, the ECU reduces electric power transmitted from the first power transmission unit or the second power transmission unit that is transmitting electric power to the vehicle. The ECU sets the sensing region to be larger when the power reception unit receives electric power from the first power transmission unit than when the power reception unit receives electric power from the second power transmission unit.

9 Claims, 16 Drawing Sheets

FIG.2

WIRELESS POWER TRANSFER SYSTEM, VEHICLE, SERVER, AND POWER TRANSMISSION DEVICE

This nonprovisional application is based on Japanese Patent Application No. 2021-135059 filed on Aug. 20, 2021 with the Japan Patent Office, the entire contents of which are hereby incorporated by reference.

BACKGROUND

Field

The present disclosure relates to a wireless power transfer system, a vehicle, a server, and a power transmission device.

Description of the Background Art

Japanese Patent Laying-Open No 2012-165497 discloses a wireless power feeding system for a vehicle. The wireless power feeding system includes a power feeding unit, a power reception unit, living body sensing means, and a wireless power feeding controller. The power feeding unit is provided external to a vehicle. The power reception unit is provided in the vehicle. The living body sensing means senses the presence of a living body in a sensing region around the vehicle. When the living body sensing means senses the presence of a living body while the power feeding unit is feeding electric power to the power reception unit, the wireless power feeding controller limits the electric power to be fed (reduces the electric power to be transmitted) from the power feeding unit to the power reception unit, as compared with the case where the presence of a living body is not sensed.

SUMMARY

The power transmission unit is provided in a parking space or in a traveling lane for vehicles. While the power reception unit of the vehicle receives electric power from the power transmission unit provided in a parking space, the vehicle is stopped. Thus, it is conceivable that a person such as a user may come closer to the vehicle in the stopped state. If the user carries an electric device, an adverse effect occurs that the electric device is influenced by a leakage electromagnetic field generated during wireless charging.

On the other hand, the charging lane is provided on a highway, for example, and it is rare that a person is present around the charging lane. It is rather conceivable that other vehicles travel near the vehicle that performs charging while traveling on a charging lane.

Thus, if a wide sensing region is set when the vehicle performs charging while traveling on the charging lane, other vehicles traveling near this vehicle are sensed, and thus, the electric power to be transmitted is reduced. This results in an adverse effect that charging cannot be satisfactorily performed.

Thus, in the prior art, no study has been made to set a sensing region suitable for a use case of wireless charging, which poses a problem of causing the above-described adverse effect.

The present disclosure has been made in light of the above-described problem, and an object of the present disclosure is to provide a wireless power transfer system, a vehicle, a server, and a power transmission device that are capable of suppressing occurrence of various adverse effects in a use case of wireless charging.

A wireless power transfer system of the present disclosure includes a first power transmission unit, a second power transmission unit, a power reception unit, a sensing unit, and a controller. The first power transmission unit is provided in a parking space. The second power transmission unit is provided in a traveling lane for a vehicle. The power reception unit wirelessly receives electric power from the first power transmission unit or the second power transmission unit. The sensing unit senses a sensing target in a sensing region set around the vehicle when the power reception unit receives electric power from the first power transmission unit or the second power transmission unit. When the sensing unit senses the sensing target, the controller reduces electric power transmitted from the first power transmission unit or the second power transmission unit that is transmitting electric power to the vehicle. Further, the controller sets the sensing region to be larger when the power reception unit receives electric power from the first power transmission unit than when the power reception unit receives electric power from the second power transmission unit.

According to the configuration as described above, the sensing target is sensed more readily when the power reception unit receives electric power from the first power transmission unit than when the power reception unit receives electric power from the second power transmission unit. Thus, the electric power transmitted from the first power transmission unit is reduced more readily than the electric power transmitted from the second power transmission unit. As a result, the intensity of the leakage electromagnetic field generated from the first power transmission unit tends to be weaker than the intensity of the leakage electromagnetic field generated from the second power transmission unit. Thus, the influence exerted by the leakage electromagnetic field upon electric devices around the vehicle can be reduced more when the power reception unit receives electric power from the first power transmission unit than when the power reception unit receives electric power from the second power transmission unit. From a different point of view, the electric power transmitted from the second power transmission unit is less readily reduced than the electric power transmitted from the first power transmission unit. Thus, wireless charging can be performed more satisfactorily when the power reception unit receives electric power from the second power transmission unit than when the power reception unit receives electric power from the first power transmission unit.

When the sensing target is sensed, the controller may more reduce electric power transmitted from the first power transmission unit or the second power transmission unit that is transmitting electric power to the vehicle as a distance between the sensing target and the first power transmission unit or the second power transmission unit that is transmitting electric power to the vehicle is shorter.

The influence exerted upon an electric device by the leakage electromagnetic field generated from the currently operating power transmission unit is larger as the distance between this power transmission unit and the electric device (a sensing target such as a person carrying this electric device) is shorter. According to the configuration as described above, even when the distance between the power transmission unit and the electric device becomes shorter, the electric power to be transmitted is reduced, and thereby, an increase in intensity of the leakage electromagnetic field is suppressed. Thereby, the influence exerted by the leakage electromagnetic field upon the electric device can be prevented from increasing.

When the sensing target is sensed, the controller may stop the first power transmission unit or the second power transmission unit that is transmitting electric power to the vehicle.

According to the configuration as described above, when the sensing target is sensed, generation of the leakage electromagnetic field from the power transmission unit that is transmitting electric power to the vehicle is stopped. As a result, the electric device can be prevented from being influenced by the leakage electromagnetic field.

A vehicle of the present disclosure includes a power reception unit and a controller. The power reception unit wirelessly receives electric power from a first power transmission unit provided in a parking space or a second power transmission unit provided in a traveling lane for a vehicle. When a sensing unit senses a sensing target in a sensing region set around the vehicle, the controller reduces electric power transmitted from the first power transmission unit or the second power transmission unit that is transmitting electric power to the vehicle. The sensing unit senses the sensing target when the power reception unit receives electric power from the first power transmission unit or the second power transmission unit. The controller sets the sensing region to be larger when the power reception unit receives electric power from the first power transmission unit than when the power reception unit receives electric power from the second power transmission unit.

When the sensing target is sensed, the controller may more reduce electric power transmitted from the first power transmission unit or the second power transmission unit that is transmitting electric power to the vehicle as a distance between the sensing target and the first power transmission unit or the second power transmission unit that is transmitting electric power to the vehicle is shorter.

When the sensing target is sensed, the controller may stop the first power transmission unit or the second power transmission unit that is transmitting electric power to the vehicle.

A server of the present disclosure is a server of a system including a first power transmission unit, a second power transmission unit, a power reception unit, and a sensing unit. The first power transmission unit is provided in a parking space. The second power transmission unit is provided in a traveling lane for a vehicle. The power reception unit wirelessly receives electric power from the first power transmission unit or the second power transmission unit. The sensing unit senses a sensing target in a sensing region set around the vehicle when the power reception unit receives electric power from the first power transmission unit or the second power transmission unit. The server includes an acquisition unit and a controller. The acquisition unit acquires sensing information indicating that the sensing unit senses the sensing target. When the acquisition unit acquires the sensing information, the controller reduces electric power transmitted from the first power transmission unit or the second power transmission unit that is transmitting electric power to the vehicle. Further, the controller sets the sensing region to be larger when the power reception unit receives electric power from the first power transmission unit than when the power reception unit receives electric power from the second power transmission unit.

When the sensing target is sensed, the controller may more reduce electric power transmitted from the first power transmission unit or the second power transmission unit that is transmitting electric power to the vehicle as a distance between the sensing target and the first power transmission unit or the second power transmission unit that is transmitting electric power to the vehicle is shorter.

When the sensing target is sensed, the controller may stop the first power transmission unit or the second power transmission unit that is transmitting electric power to the vehicle.

A power transmission device of the present disclosure includes a power transmission unit, a sensing unit, and a controller. The power transmission unit is provided in a parking space and wirelessly transmits electric power to a power reception unit provided in a vehicle. The sensing unit senses a sensing target in a parking space sensing region as a sensing region set around the vehicle when the power transmission unit transmits electric power to the power reception unit. When the sensing unit senses the sensing target, the controller reduces electric power transmitted from the power transmission unit. The power reception unit is capable of wirelessly receiving electric power from a traveling lane power transmission device provided in a traveling lane. The traveling lane power transmission device senses a sensing target in a traveling lane sensing region as a sensing region set around the vehicle when the traveling lane power transmission device transmits electric power to the power reception unit. Further, the controller sets the parking space sensing region to be larger than the traveling lane sensing region.

Another power transmission device of the present disclosure includes a power transmission unit, a sensing unit, and a controller. The power transmission unit is provided in a traveling lane and wirelessly transmits electric power to a power reception unit provided in a vehicle. The sensing unit senses a sensing target in a traveling lane sensing region as a sensing region set around the vehicle when the power transmission unit transmits electric power to the power reception unit. When the sensing unit senses the sensing target, the controller reduces electric power transmitted from the power transmission unit. The power reception unit is capable of wirelessly receiving electric power from a parking space power transmission device provided in a parking space. The parking space power transmission device senses a sensing target in a parking space sensing region as a sensing region set around the vehicle when the parking space power transmission device transmits electric power to the power reception unit. Further, the controller sets the traveling lane sensing region to be smaller than the parking space sensing region.

The foregoing and other objects, features, aspects and advantages of the present disclosure will become more apparent from the following detailed description of the present disclosure when taken in conjunction with the accompanying drawings.

BRIEF DESCRIPTION OF THE DRAWINGS

FIG. 2 is a diagram for illustrating a method of adjusting a position of a camera.

DESCRIPTION OF THE PREFERRED EMBODIMENTS

Figure 1:
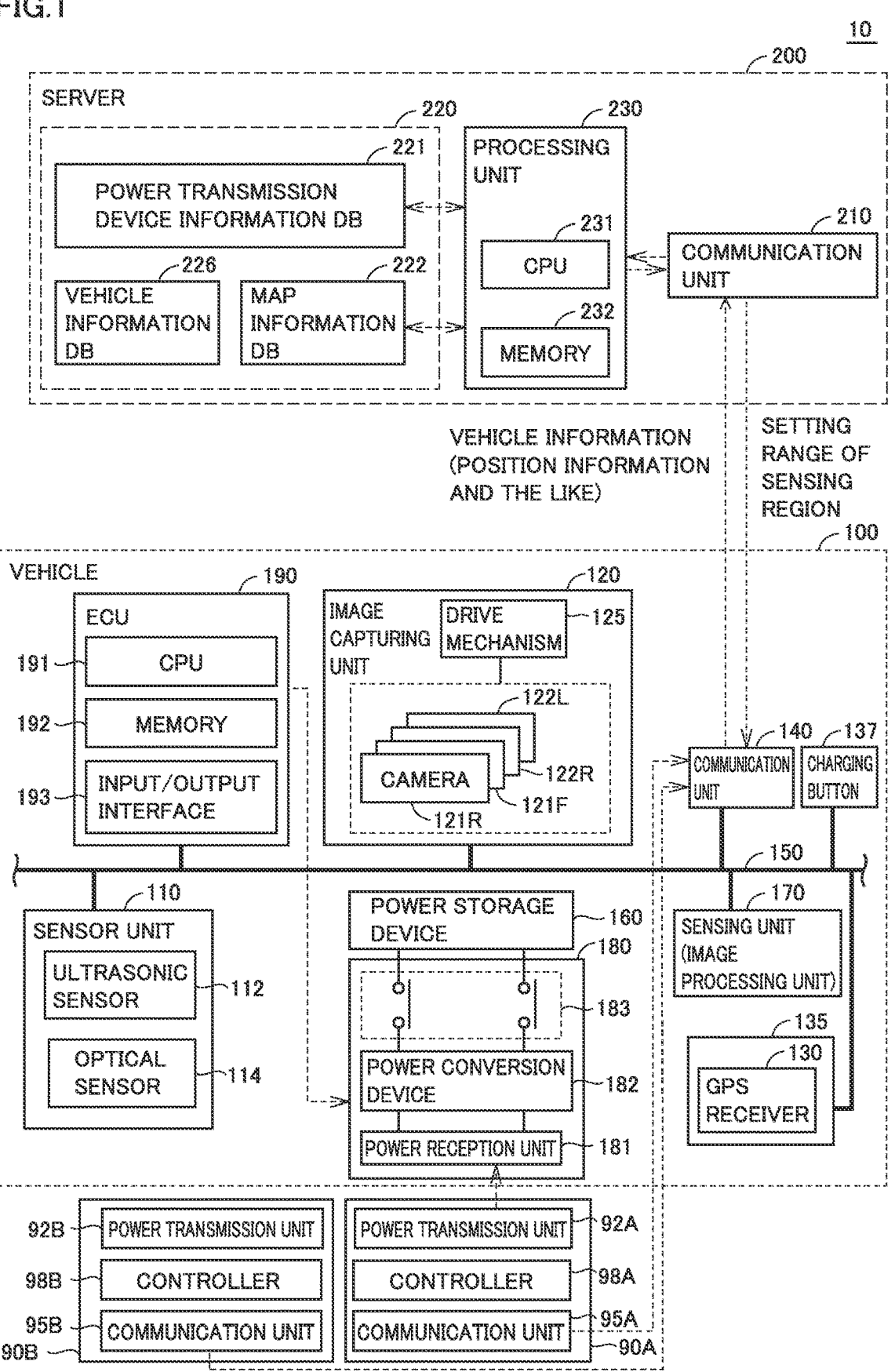
FIG. 1 is a diagram schematically showing an overall configuration of a wireless power transfer system according to a present embodiment.

The following describes embodiments of the present disclosure in detail with reference to the accompanying drawings, in which the same or corresponding portions are denoted by the same reference characters, and the description thereof will not be repeated.

First Embodiment

FIG. 1 is a diagram schematically showing an overall configuration of a wireless power transfer system according to the present embodiment. Referring to FIG. 1, a wireless power transfer system 10 includes a vehicle 100, power transmission devices 90A and 90B, and a server 200.

Vehicle 100 is an electrically powered vehicle on which a power storage device for traveling is mounted and is, for example, a battery electric vehicle (BEV). Vehicle 100 includes a power storage device 160, a power reception device 180, a sensor unit 110, an image capturing unit 120, a sensing unit (an image processing unit) 170, a navigation system 135, a charging button 137, a communication unit 140, and an electronic control unit (ECU) 190. These components are connected to each other through a vehicle-mounted network 150 such as controller area network (CAN).

Power storage device 160 is a power storage component that stores electric power for traveling. Power storage device 160 is configured to include, for example, a secondary battery such as a lithium-ion battery or a nickel-metal hydride battery, and a power storage element such as an electric double layer capacitor. The amount of power storage in power storage device 160 is represented by a state of charge (SOC), for example. Power storage device 160 is provided with a voltage sensor, a current sensor, and a temperature sensor (none of which is shown) for detecting the voltage, the current, and the temperature, respectively, of power storage device 160. The values detected by these sensors are output to ECU 190.

Power reception device 180 includes a power reception unit 181, a power conversion device 182, and a relay 183. Power reception unit 181 includes a power reception coil (not shown). Power reception unit 181 wirelessly receives electric power from a power transmission unit 92A of power transmission device 90A or a power transmission unit 92B of power transmission device 90B (both of which will be described later).

Power conversion device 182 converts the electric power wirelessly received by power reception unit 181 into direct-current (DC) power having the voltage level of power storage device 160.

Relay 183 is provided between power conversion device 182 and power storage device 160. Power storage device 160 is charged when power conversion device 182 is activated and relay 183 is controlled to be closed while power reception unit 181 receives electric power. Hereinafter, charging of power storage device 160 with the electric power received by power reception unit 181 will also be referred to as "wireless charging" of vehicle 100.

Power transmission device 90A (a parking space power transmission device) is provided in a parking space for vehicle 100. Power transmission device 90A is configured to wirelessly transmit electric power to power reception unit 181 of vehicle 100. Power transmission device 90A includes a power transmission unit 92A, a communication unit 95A, and a controller 98A. Power transmission device 90A may further include an image processing circuit having a function similar to that of a sensing unit 170 (described later).

Power transmission unit 92A wirelessly transmits electric power to power reception unit 181 of vehicle 100 through an electromagnetic field. Specifically, power transmission unit 92A includes a power transmission coil (not shown). When an alternating current is supplied from a power grid (not shown) to the power transmission coil, an electromagnetic field is formed around the power transmission coil. Then, the power reception coil provided in power reception unit 181 receives electric power through this electromagnetic field. Thereby, electric power is transferred from power transmission unit 92A to power reception unit 181.

Communication unit 95A is configured to establish short-range communication with vehicle 100. Communication unit 95A transmits, for example, a signal indicating information about power transmission device 90A to vehicle 100 through short-range communication. This signal includes: a signal indicating that power transmission device 90A is a power transmission device for a parking space; and a signal indicating that power transmission device 90A can immediately transmit electric power to vehicle 100 (hereinafter, also referred to as the "first signal" of power transmission device 90A). Communication unit 95A may be configured to communicate with server 200 or power transmission device 90B.

Controller 98A includes a processor such as a CPU and a memory (none of which is shown). Controller 98A controls power transmission unit 92A and communication unit 95A in accordance with a program stored in the memory.

Power transmission device 90B (a traveling lane power transmission device) is provided in a charging lane. The charging lane serves as a traveling lane on which vehicle 100 travels for wireless charging. The charging lane will be described later in detail. Power transmission device 90B includes a power transmission unit 92B, a communication unit 95B, and a controller 98B. Power transmission device 90B may further include an image processing circuit having a function similar to that of sensing unit 170 (described later). The detailed configuration of power transmission device 90B will be described later in detail.

Sensor unit 110 includes an ultrasonic sensor 112 and an optical sensor 114. Ultrasound sensor 112 includes a transmitter and a receiver (both of which are not shown). The transmitter transmits ultrasonic waves toward an object around vehicle 100. The receiver is configured to receive a reflected wave reflected by the object. Then, the presence or absence of an object in a region around vehicle 100 is sensed in accordance with the intensity of the reflected wave received by the receiver (the intensity of reception). Similarly, optical sensor 114 includes an illumination device and a light receiver (both of which are not shown). The illumination device applies light waves toward an object around vehicle 100. The light receiver is configured to receive light waves reflected by the object. Then, the presence or absence of an object in the region around vehicle 100 is sensed in accordance with the intensity of the reflected light received by the light receiver (the intensity of received light). Details of a method of sensing by ultrasonic sensor 112 and optical sensor 114 as well as a method of using results of sensing will be described later in detail.

Image capturing unit 120 includes cameras 121R, 121F, 122R, and 122L, and a drive mechanism 125. Cameras 121R, 121F, 122R, and 122L capture images viewed rearward, forward, rightward, and leftward, respectively, from vehicle 100. In the present embodiment, these cameras are fish-eye cameras. Drive mechanism 125 is connected to cameras 121R, 121F, 122R, and 122L. Drive mechanism 125 is provided for adjusting the positions of these cameras. A method of adjusting the positions of these cameras will be described later in detail.

Sensing unit 170 is configured to sense a sensing target in a sensing region (described later) set around vehicle 100 when power reception unit 181 receives electric power from power transmission unit 92A or 92B. Sensing unit 170 is an image processing circuit, for example. By applying a known image processing technique such as pattern recognition to an image captured by camera 121R, sensing unit 170 senses a sensing target (for example, a living body such as a human body) in this image. Thereby, the sensing target located rearward of vehicle 100 is sensed. Similarly, by applying an image processing technique to the images captured by cameras 121F, 122R, and 1221, sensing unit 170 senses a sensing target in each of these images. In this way, any sensing target around (located frontward, rearward, rightward, and leftward of) vehicle 100 is sensed. The signal indicating the result of sensing by sensing unit 170 is output to ECU 190 through vehicle-mounted network 150.

Navigation system 135 includes a global positioning system (GPS) receiver 130. GPS receiver 130 identifies the current position of vehicle 100 based on radio waves from an artificial satellite. The position information indicating the current position of vehicle 100 is used by ECU 190 or server 200. Navigation system 135 further includes map information (not shown).

Charging button 137 is operated by a user who wants to perform wireless charging of vehicle 100. By operating charging button 137, the user can switch charging button 137 between ON and OFF. Wireless charging of vehicle 100 is performed when charging button 137 is ON, and is not performed when charging button 137 is OFF. ECU 190 outputs a signal indicating whether charging button 137 is ON or OFF. Charging button 137 may be a physical button or a button achieved by software (for example, a button displayed on a touch screen).

Communication unit 140 is configured to establish short-range communication with power transmission device 90A or 90B external to vehicle 100. Further, communication unit 140 is configured to communicate with server 200 through a communication network such as the Internet.

ECU 190 is configured to include a CPU 191, a memory 192, and an input/output interface 193. Memory 192 includes a read only memory (ROM) and a random access memory (RAM) (both of which are not shown). The ROM stores programs executed by CPU 191. The RAM temporarily stores data and the like referred to by CPU 191.

ECU 190 controls each of devices in vehicle 100 in accordance with each sensor signal, and programs, data, maps, and the like stored in the memory. As an example, ECU 190 controls sensor unit 110, image capturing unit 120, communication unit 140, sensing unit 170, and power reception device 180 (power conversion device 182 and relay 183).

ECU 190 calculates the SOC of power storage device 160 based on the voltage, the current, and the temperature of power storage device 160. The SOC is calculated, for example, using known methods such as a method using an OCV (open circuit voltage)-SOC curve (a map or the like) showing the relation between the OCV and the SOC.

ECU 190 is configured to perform wireless charging with power transmission device 90A or 90B. For example, ECU 190 transmits a charging start request to power transmission device 90A or 90B through communication unit 140, and controls relay 183 to be closed. Thereby, wireless charging is started. When the SOC of power storage device 160 reaches a charging threshold value, ECU 190 transmits a charging stop request through communication unit 140 to power transmission device 90A or 90B that is transmitting electric power to vehicle 100. Thereby, wireless charging ends. The charging threshold value is, for example, the SOC obtained when power storage device 160 is fully charged and is determined in advance appropriately by experiments and the like.

ECU 190 is configured to set a sensing region in which sensing unit 170 senses a sensing target. Specifically, ECU 190 controls drive mechanism 125 to adjust the positions of cameras 121R, 121F, 122R, and 122L. Thereby, ECU 190 can set the sensing region while adjusting the area size of the sensing region. The sensing region may be set by server 200 or power transmission devices 90A and 90B. Details of the method of setting the sensing region will be described later.

When sensing unit 170 senses a sensing target, ECU 190 reduces the electric power transmitted from power transmission unit 92A or 92B that is transmitting electric power to vehicle 100 (the currently operating power transmission unit). For example, when a sensing target is sensed while power transmission unit 92A transmits electric power to vehicle 100, ECU 190 transmits a request to power transmission device 90A through communication unit 140 to reduce the electric power transmitted from power transmission unit 92A. Similarly, when a sensing target is sensed while power transmission unit 92B transmits electric power to vehicle 100, ECU 190 transmits a request to power transmission device 90B through communication unit 140 to reduce the electric power transmitted from power transmission unit 92B.

ECU 190 exchanges various pieces of information with server 200 through communication unit 140. As an example, ECU 190 transmits vehicle information indicating various pieces of information of vehicle 100 to server 200. The vehicle information includes: position information about vehicle 100; and information indicating whether a sensing target has been sensed or not in the sensing region (a result of sensing by sensing unit 170). When the sensing region is set by server 200, ECU 190 receives the setting range of the sensing region from server 200 through communication unit 140.

Server 200 may be a stationary device or may be what is called a mobile server that is a portable type. Server 200 includes a communication unit (an acquisition unit) 210, a storage unit 220, and a processing unit (a controller) 230.

Communication unit 210 is configured to communicate with vehicle 100. Through communication, communication unit 210 acquires (receives) vehicle information including the position information of vehicle 100. When the sensing region is set by server 200, communication unit 210 transmits the setting range of the sensing region to vehicle 100.

Storage unit 220 includes a power transmission device information database (DB) 221, a map information database (DB) 222, and a vehicle information database (DB) 226.

Power transmission device information DB 221 stores the information indicating the positions of the power transmission devices (power transmission device 90A, power transmission device 90B, and the like) registered in this DB. Also, power transmission device information DB 221 stores the information indicating whether the registered power transmission device is a power transmission device for a traveling lane or a power transmission device for a parking space. Map information DB 222 stores map information including road map data.

Vehicle information DB 226 stores the information such as an ID of vehicle 100 and the position information of vehicle 100. These databases are sequentially updated to the latest state by processing unit 230.

Processing unit 230 includes a CPU 231 and a memory 232. CPU 231 executes programs and data stored in memory 232. Memory 232 includes a ROM and a RAM (both of which are not shown). The ROM stores programs executed by CPU 231. The RAM temporarily stores data referred to by CPU 231.

Figure 2:
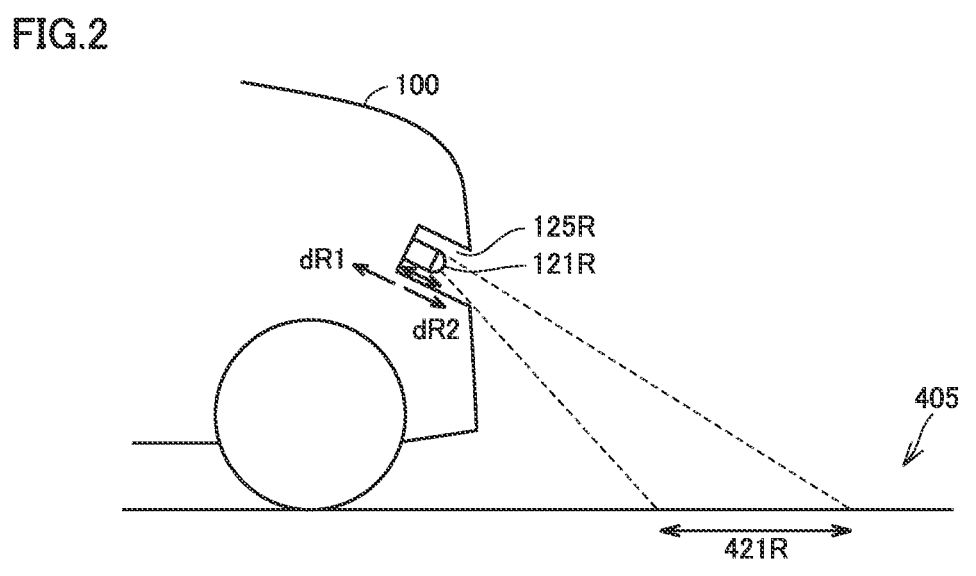

FIG. 2 is a diagram for illustrating a method of adjusting the position of camera 121R. Referring to FIG. 2, vehicle 100 is provided with a recess 125R. Camera 121R is provided inside recess 125R of vehicle 100. Recess 125R has an opening along which a protective reinforcing plastic (not shown) for protecting camera 121R is attached. In the present example, the region whose image is captured by camera 121R is a region 421R on a ground 405.

ECU 190 controls drive mechanism 125 (FIG. 1), and thereby can adjust the position of camera 121R in a depth direction d1R of recess 125R. For example, ECU 190 moves camera 121R in depth direction d1R inside recess 125R, and thereby can set the position of camera 121R to be located deeper in depth direction d1R. On the other hand, ECU 190 moves camera 121R in a direction d2R opposite to depth direction dl R, and thereby can set the position of camera 121R to be located shallower in depth direction d1R.

Similarly, vehicle 100 is further provided with three recesses (not shown). Cameras 121F, 122R, and 122L are provided in their respective three recesses. By using drive mechanism 125 as in the case of camera 121R, ECU 190 can adjust the positions of these three cameras in the depth directions of their respective recesses.

Figure 3:
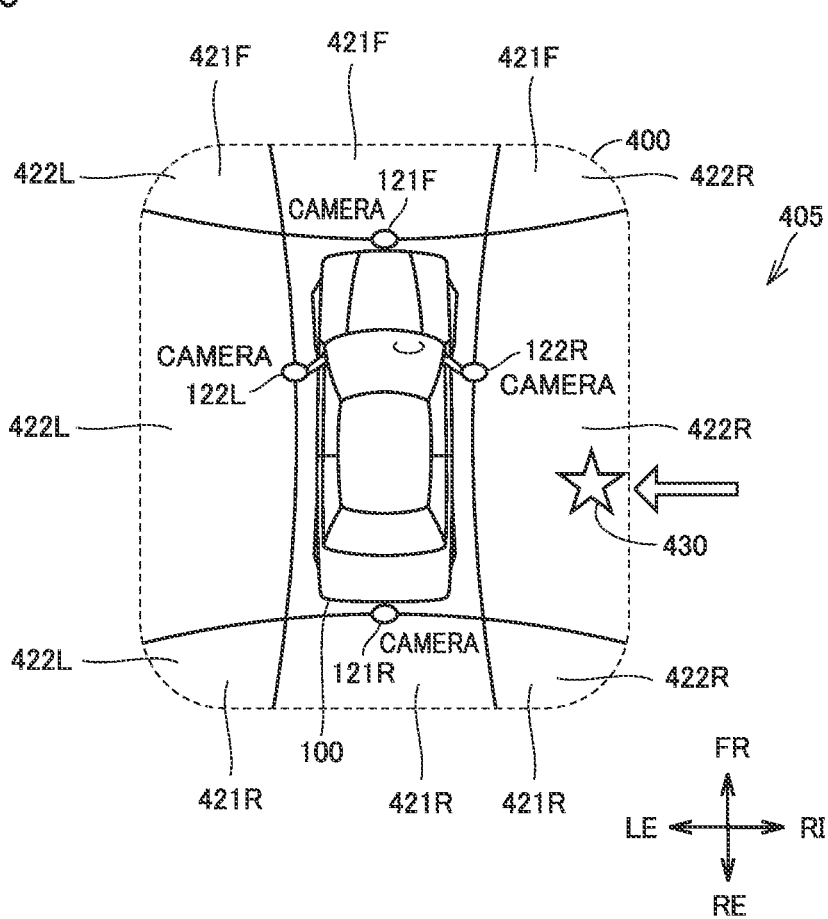
FIG. 3 is a diagram for illustrating a sensing region in which a sensing unit senses a sensing target.

FIG. 3 is a diagram for illustrating a sensing region in which sensing unit 170 senses a sensing target. Referring to FIG. 3, a direction FR represents the forward direction of vehicle 100. A direction RE represents the rearward direction of vehicle 100. A direction RI represents the rightward direction of vehicle 100. A direction LE represents the leftward direction of vehicle 100. In other words, directions FR and RE represent the direction in which vehicle 100 moves. Directions RI and LE represent the direction perpendicular to the direction in which vehicle 100 moves.

The region whose image is captured by camera 121R is region 421R on ground 405. The region whose image is captured by camera 121F is a region 421F on ground 405. The region whose image is captured by camera 122R is a region 422R on ground 405. The region whose image is captured by camera 122L is a region 422L on ground 405. In the present example, a part of the region whose image is captured by each camera (for example, region 421R) is superimposed on a part of the region whose image is captured by another camera (for example, region 422L).

Sensing unit 170 senses a sensing target in an image of the region captured by each camera (a captured image). Sensing region 400 is configured to include regions 421R, 421F, 422L, and 422R. When a sensing target 430 (for example, a person) enters sensing region 400, sensing unit 170 can sense sensing target 430 using an image captured by each camera.

Figure 4:
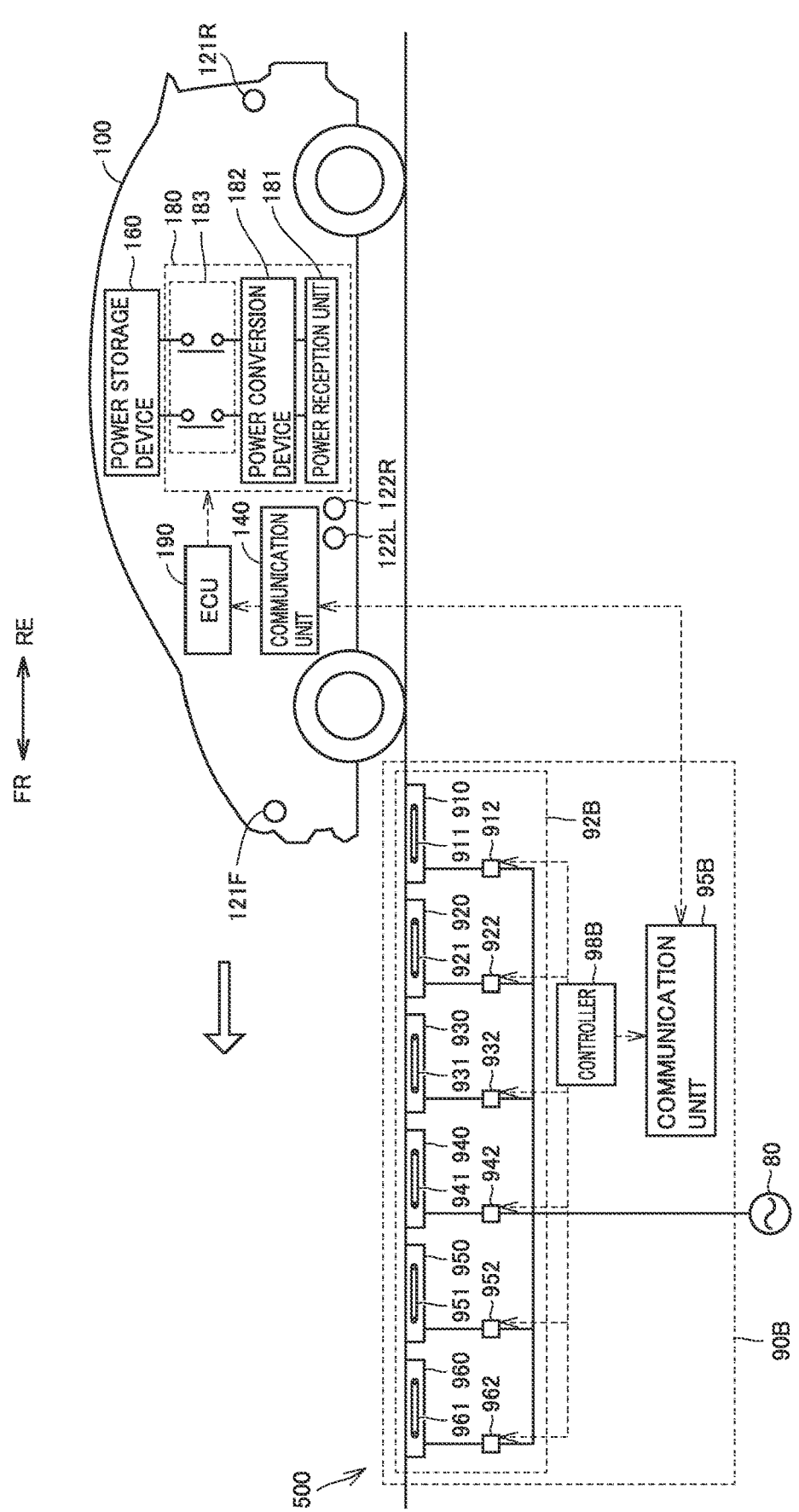
FIG. 4 is a diagram specifically showing a configuration of a power transmission device for a traveling lane.

FIG. 4 is a diagram specifically showing the configuration of power transmission device 90B for a traveling lane. Power transmission device 90B is provided in a charging lane 500 as a traveling lane on which vehicle 100 travels for wireless charging.

Communication unit 953 is provided to establish short-range communication between power transmission device 90B and vehicle 100. Communication unit 95B transmits, for example, a signal indicating information about power transmission device 90B to vehicle 100 through short-range communication. This signal includes: a signal indicating that power transmission device 90B is a power transmission device for charging lane 500, and a signal indicating that power transmission device 90B can immediately transmit electric power to vehicle 100 (the first signal from power transmission device 90B). Communication unit 95A may be configured to communicate with server 200 or power transmission device 90A.

Power transmission unit 92B includes power transmission modules 910, 920, 930, 940, 950, and 960, and power supply circuits 912, 922, 932, 942, 952, and 962.

Power transmission modules 910, 920, 930, 940, 950, and 960 are arranged in a line. Power transmission modules 910, 920, 930, 940, 950, and 960 include power transmission coils 911, 921, 931, 941, 951, and 961, respectively. Each power transmission module further includes a detector (not shown) for detecting passage of vehicle 100. Each detector includes an optical sensor, a weight sensor, and the like. These power transmission modules are provided below charging lane 500 in the example shown in FIG. 3, but may be provided on a sidewall of charging lane 500. FIG. 3 shows six power transmission modules 910, 920, 930, 940, 950, and 960, but the number of power transmission modules is not limited.

Power supply circuits 912, 922, 932, 942, 952, and 962 are connected to power transmission modules 910, 920, 930, 940, 950, and 960, respectively. Each power supply circuit converts alternating-current (AC) power from a commercial power supply 80 into AC power having different voltage levels. Each converted AC power is supplied to a corresponding one of the power transmission modules.

Controller 98B includes a processor such as a CPU and a memory (none of which is shown). Controller 98B controls power transmission unit 92B and communication unit 95B in accordance with a program stored in the memory.

In accordance with the detection signal from the above-mentioned detector, controller 98B locates the position at which vehicle 100 travels. When short-range communication is established between vehicle 100 and power transmission device 90B, the first signal from power transmission device 90B is transmitted to vehicle 100.

When ECU 190 of vehicle 100 receives the first signal through communication unit 140 while charging button 137 (FIG. 1) is ON, ECU 190 transmits a charging start request to power transmission device 90B through communication unit 140.

In response to this request, controller 98B of power transmission device 90B performs control to supply electric power from commercial power supply 80 to the power transmission coil in the power transmission module located below vehicle 100 among power transmission modules 910, 920, 930, 940, 950, and 960. Specifically, controller 98B controls the power supply circuit connected to this power transmission coil such that AC power is supplied from this power supply circuit to this power transmission coil.

For example, when vehicle 100 is detected above power transmission module 910, the AC power converted by power supply circuit 912 is supplied to power transmission coil 911. Thereby, an alternating current flows through power transmission coil 911, so that an electromagnetic field is formed around power transmission coil 911. The power reception coil of power reception unit 181 in power reception device 180 of vehicle 100 wirelessly receives electric power through the electromagnetic field while vehicle 100 is traveling on charging lane 500. Then, when vehicle 100 is no longer detected above power transmission module 910, controller 98B controls power supply circuit 912 so as to stop supply of AC power to power transmission coil 911. Controller 98B perform such control for each of power transmission modules 910, 920, 930, 940, 950, and 960. Thereby, during traveling of vehicle 100, power storage device 160 is charged with the electric power received by power reception device 180 (charging while traveling).

Figure 5:
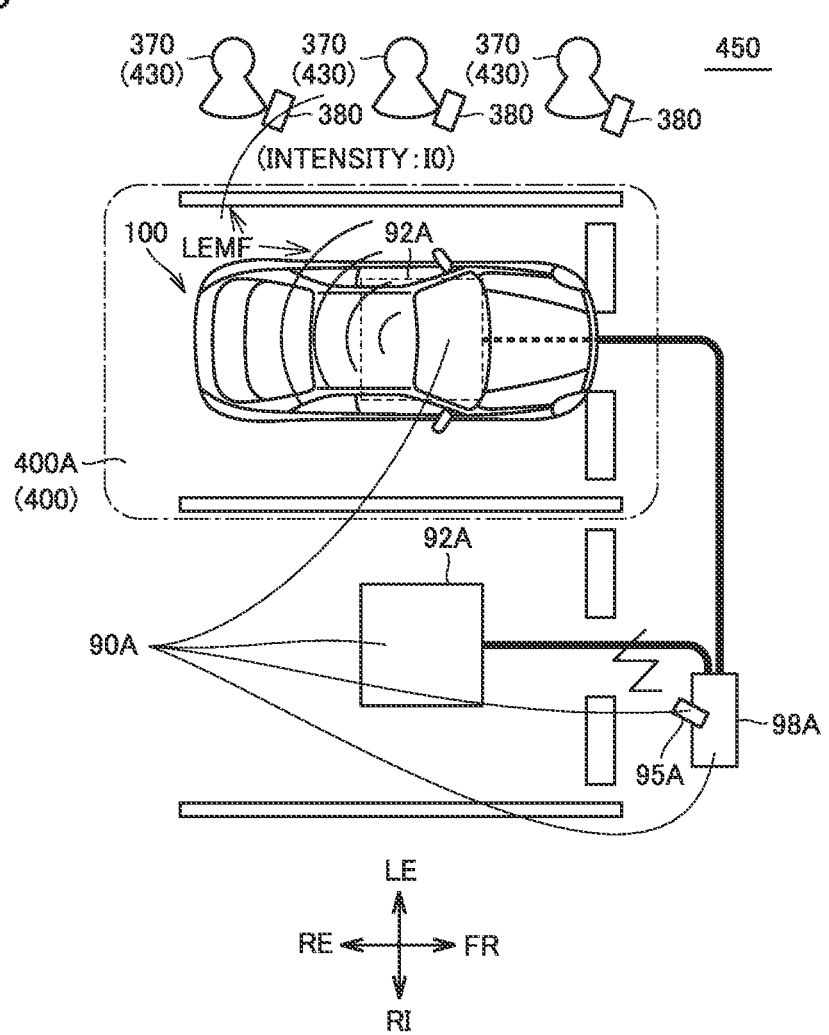
FIG. 5 is a diagram for illustrating a state in which a sensing region is set when a vehicle performs wireless charging in a parking space.

FIG. 5 is a diagram for illustrating the state in which a sensing region is set when vehicle 100 performs wireless charging in a parking space.

Referring to FIG. 5, upon completion of alignment between vehicle 100 and power transmission unit 92A of power transmission device 90A in parking space 450 while charging button 137 (FIG. 1) is ON, ECU 190 transmits a charging start request to power transmission device 90A through communication unit 140. When communication unit 95A of power transmission device 90A receives this request, controller 98A controls power transmission unit 92A to wirelessly transmit electric power to power reception unit 181 of vehicle 100. Thereby, wireless charging is performed for vehicle 100 in parking space 450. During wireless charging in parking space 450, vehicle 100 is stopped.

While wireless charging is performed in parking space 450, a leakage electromagnetic field LEMF from power transmission unit 92A is generated around vehicle 100. This results in an adverse effect that electric devices 380 carried by persons 370 around vehicle 100 are influenced by leakage electromagnetic field LEMF generated during wireless charging. Electric device 380 is, for example, communication equipment such as a smartphone. The influence of leakage electromagnetic field LEMF upon electric device 380 is larger as the distance between power transmission unit 92A that generates leakage electromagnetic field LEMF and electric device 380 (sensing target 430 such as person 370 carrying electric device 380) is shorter.

Thus, in order to reduce the influence of leakage electromagnetic field LEMF upon electric device 380, a sensing region 400A (400) is set during execution of wireless charging. Thereby, when sensing target 430 such as person 370 comes closer to power transmission unit 92A (vehicle 100) so that sensing target 430 enters sensing region 400A (a parking space sensing region), then, sensing target 430 is sensed by sensing unit 170.

In response to sensing of sensing target 430, ECU 190 reduces the electric power transmitted from power transmission unit 92A. Specifically, ECU 190 outputs a request to power transmission device 90A through communication unit 140 to reduce the electric power transmitted from power transmission unit 92A. In response to this request, controller 98A of power transmission device 90A controls power transmission unit 92A to reduce the electric power transmitted from power transmission unit 92A. As a result, the intensity of leakage electromagnetic field LEMF generated from power transmission unit 92A becomes lower than I0 that is default intensity (the intensity at the time when sensing target 430 is not located in sensing region 400). It is assumed that the intensities of leakage electromagnetic fields LEMF are compared at the same position.

In this way, the intensity of leakage electromagnetic field LEMF is lower when sensing target 430 is sensed in sensing region 400 than when sensing target 430 is not sensed in sensing region 400. Thereby, even when person 370 carrying electric device 380 comes closer to vehicle 100, electric device 380 is less influenced by leakage electromagnetic field LEMF.

Figure 6:
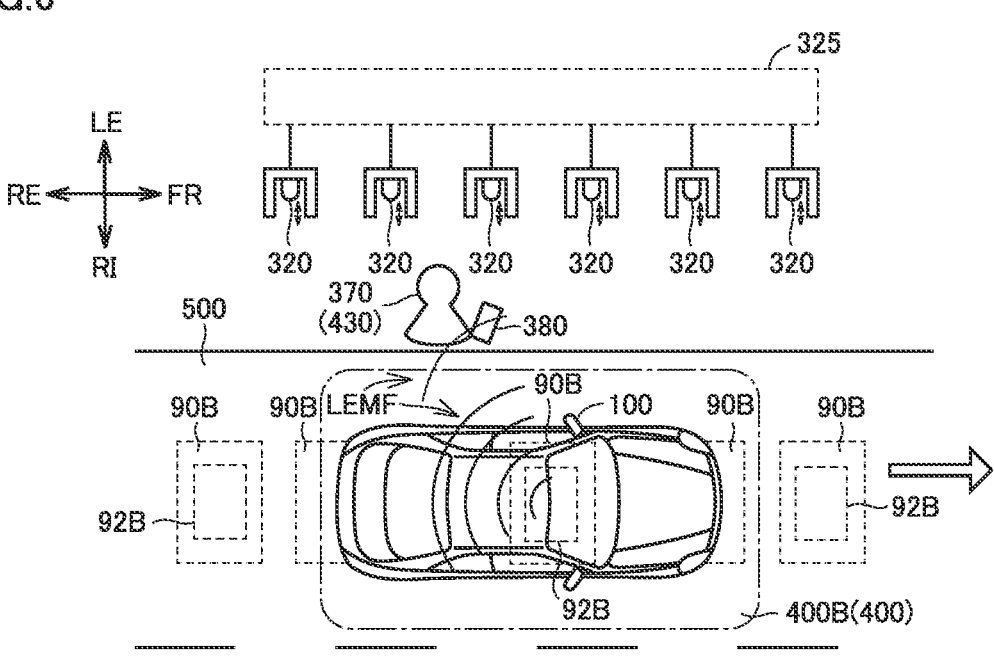
FIG. 6 is a diagram for illustrating a state in which the vehicle performs wireless charging while traveling on a charging lane

FIG. 6 is a diagram for illustrating the state in which vehicle 100 performs wireless charging while traveling on charging lane 500.

Referring to FIG. 6, while vehicle 100 travels on charging lane 500, a sensing region 400B (400) is set around vehicle 100. As in FIG. 5, sensing region 400B (a traveling lane sensing region) is set by ECU 190 in order to reduce the influence of leakage electromagnetic field LEMF upon electric device 380.

A camera 320 and a communication interface 325 are provided in the vicinity of charging lane 500. The vicinity of charging lane 500 means a space falling within a range at a prescribed distance from charging lane 500. Camera 320 is provided above charging lane 500. Camera 320 is configured to capture an image of the region around vehicle 100 that is traveling on charging lane 500 (including the region where vehicle 100 is located).

Communication interface 325 transmits a plurality of images captured by a plurality of cameras 320 to an external device such as server 200 (FIG. 1). These images may be used for setting sensing region 400B (which will be described later in detail).

Figure 7:
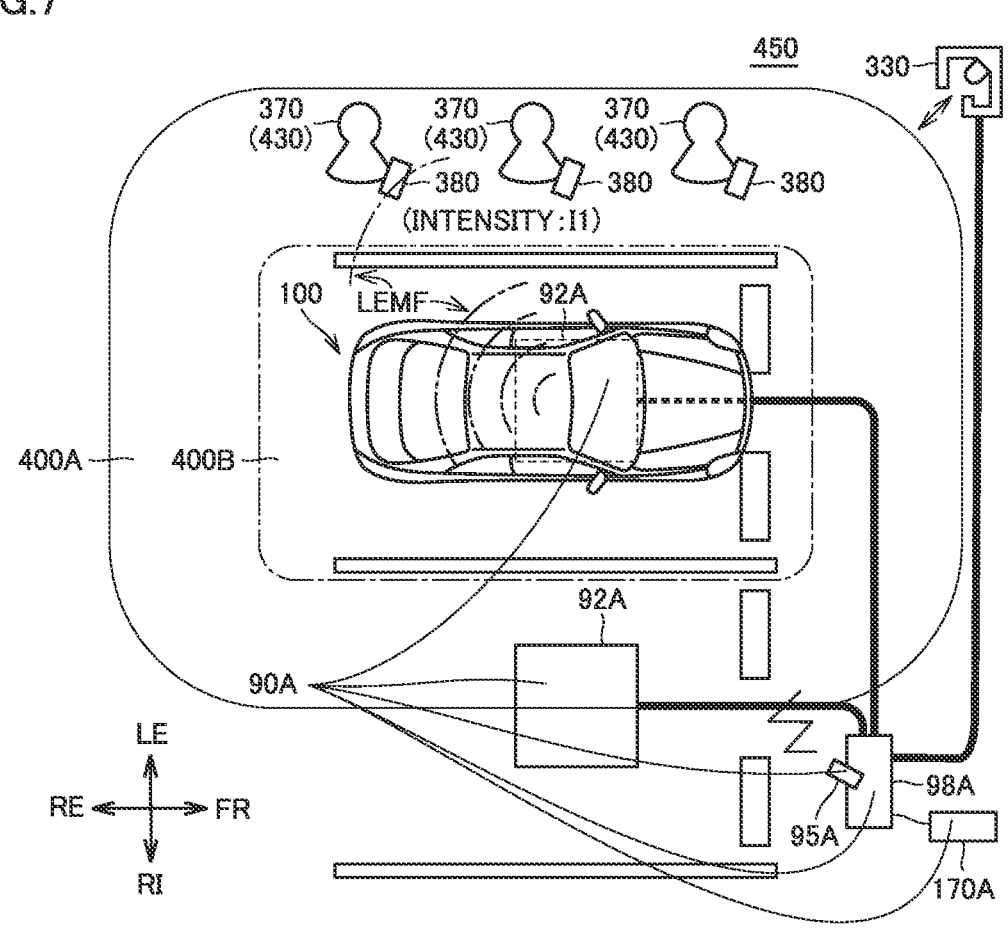
FIG. 7 is a diagram for illustrating a method of setting a sensing region according to the present embodiment.

FIG. 7 is a diagram for illustrating a method of setting sensing region 400 according to the present embodiment. The power transmission unit for wireless power transfer is provided in parking space 450 (power transmission unit 92A) or provided in charging lane 500 (power transmission unit 92B in FIG. 6). When power reception unit 181 receives electric power from power transmission unit 92A provided in parking space 450, vehicle 100 is stopped. Commonly, power transmission unit 92A is provided in a parking lot (including a taxi stand) or the like. Thus, it is conceivable that person 370 such as a user comes closer to vehicle 100 while vehicle 100 is stopped.

On the other hand, when power reception unit 181 receives electric power from power transmission unit 92B provided in charging lane 500, vehicle 100 is traveling. Charging lane 500 is provided on a highway, for example, and it is rare that person 370 is present around charging lane 500.

Therefore, it is considered that the number of persons 370 who come closer to vehicle 100 (the power transmission unit that is transmitting electric power) is larger when vehicle 100 performs wireless charging while it is stopped in parking space 450 than when vehicle 100 performs charging while it is traveling (wireless charging) on charging lane 500. Thus, it is considered that the number of electric devices 380 influenced by leakage electromagnetic field LEMF around vehicle 100 is also larger when wireless charging is performed in parking space 450 than when wireless charging is performed on charging lane 500.

Further, it is conceivable that, during wireless charging on charging lane 500, another vehicle (not shown) travels near vehicle 100 that is performing charging while traveling on charging lane 500.

Thus, if large sensing region 400 is set when vehicle 100 is performing charging while traveling on charging lane 500, another vehicle traveling near vehicle 100 may be sensed in sensing region 400. Thereby, the electric power to be transmitted is reduced. This results in an adverse effect that vehicle 100 cannot satisfactorily perform charging while traveling.

Accordingly, ECU 190 in wireless power transfer system 10 according to the present embodiment sets sensing regions 400A and 400B such that sensing region 400A is larger when power reception unit 181 receives electric power from power transmission unit 92A than when power reception unit 181 receives electric power from power transmission unit 92B (FIG. 6). In other words, ECU 190 sets sensing regions 400A and 400B such that sensing region 400A (FIGS. 5 and 7) is larger than sensing region 400B (FIG. 6).

According to the present embodiment, sensing target 430 is sensed more readily when power reception unit 181 receives electric power from power transmission unit 92A than when power reception unit 181 receives electric power from power transmission unit 92B (FIG. 6). Specifically, as shown in FIG. 7, the position of sensing target 430 tends to be located within sensing region 400 than in the case of FIG. 6, and thereby, the electric power transmitted from power transmission unit 92A that is transmitting electric power tends to be reduced. As a result, the intensity of leakage electromagnetic field LEMF generated from power transmission unit 92A tends to be lower than the intensity of leakage electromagnetic field LEMF generated from power transmission unit 92B (FIG. 6). In the example in FIG. 7, since sensing target 430 is sensed in sensing region 400A, the intensity of leakage electromagnetic field LEMF is reduced from I0 (FIG. 5) as default intensity to I1 (I1<I0). Therefore, the influence exerted upon electric device 380 by leakage electromagnetic field LEMF generated from power transmission unit 92A can be reduced.

From a different point of view, since sensing region 400B is smaller than sensing region 400A on a highway or the like on which charging lane 500 is provided, it is possible to suppress reduction in electric power transmitted every time another vehicle travels in the vicinity of vehicle 100. As a result, the adverse effect that vehicle 100 cannot satisfactorily perform charging while traveling can be reduced.

Power transmission device 90A in FIG. 7 includes a sensing unit 170A in addition to power transmission unit

92A, communication unit 95A, and controller 98A. Sensing unit 170A will be described later.

Figure 8:
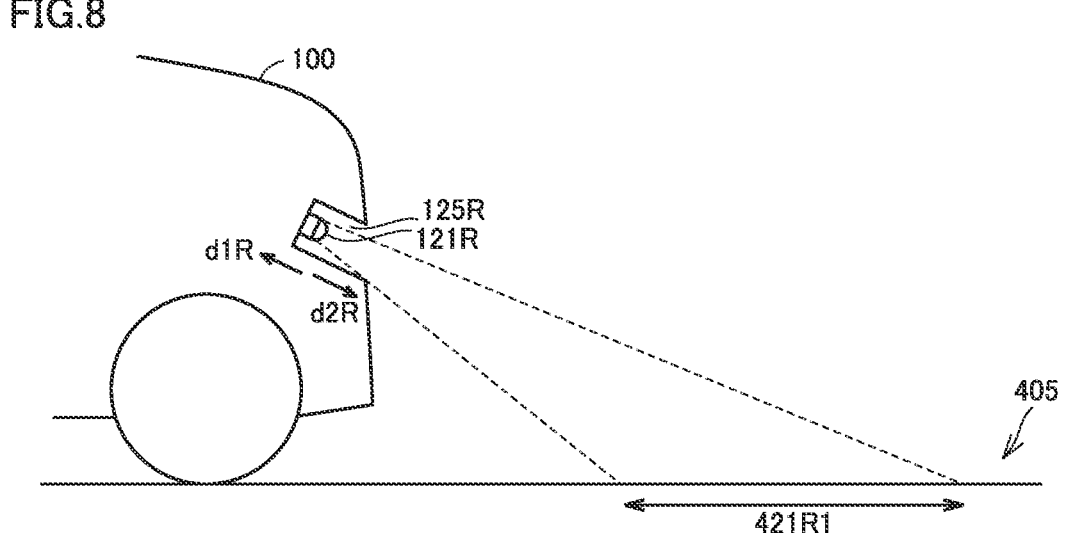
FIG. 8 is a diagram for illustrating the method of setting a sensing region according to the present embodiment.
Figure 9:
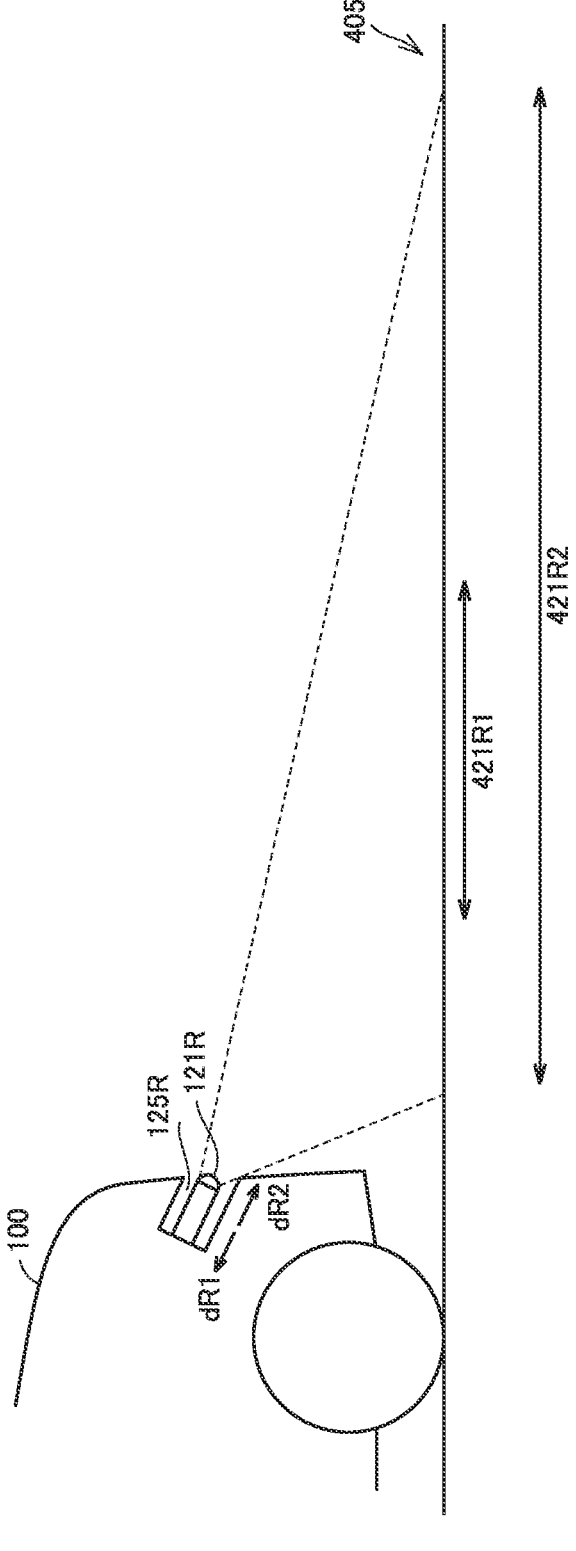
FIG. 9 is a diagram for illustrating the method of setting a sensing region according to the present embodiment.

FIGS. 8 and 9 each illustrate a method of setting sensing region 400 according to the present embodiment. As described with reference to FIG. 2, ECU 190 can adjust the position of camera 121R in depth direction dl R of recess 125R. Similarly, ECU 190 can adjust the positions of cameras 121F, 122R, and 122L in the depth directions of their respective recesses.

Referring to FIG. 8, when camera 121R is located deep in depth direction d1R, camera 121R captures an image of a region 421R1 on ground 405.

Referring to FIG. 9, when camera 121R is located shallow in depth direction dl R, camera 121R captures an image of a region 421R2 on ground 405. Region 421R2 is larger than region 421R1 (FIG. 8).

Thus, ECU 190 adjusts the position (depth) of camera 121R in depth direction d1R, and thereby, can adjust the area size of the region whose image is captured by camera 121R. Similarly, ECU 190 adjusts the positions of cameras 121F, 122R, and 1221. (the depths in their respective recesses), and thereby, can adjust the area sizes of the regions whose images are captured by these cameras.

ECU 190 can adjust the area size of sensing region 400 by adjusting the area sizes of the regions whose images are captured by cameras 121R, 121F, 122R, and 122L (regions 421R, 421F, 422R, and 422L in FIG. 3) as described above. Thus, ECU 190 can set sensing regions 400A and 400B such that sensing region 400A is larger than sensing region 400B.

Referring again to FIG. 7, the state in which "sensing region 400A is larger than sensing region 400B" means that the area of sensing region 400A is larger than the area of sensing region 400B. In particular, it is preferable that ECU 190 sets sensing regions 400A and 400B (400) such that sensing region 400A is greater in width than sensing region 400B in the lateral direction (in directions LE and RI) of vehicle 100.

The camera for capturing an image used for setting sensing region 400 may be provided in charging lane 500 in place of vehicle 100.

Figure 10:
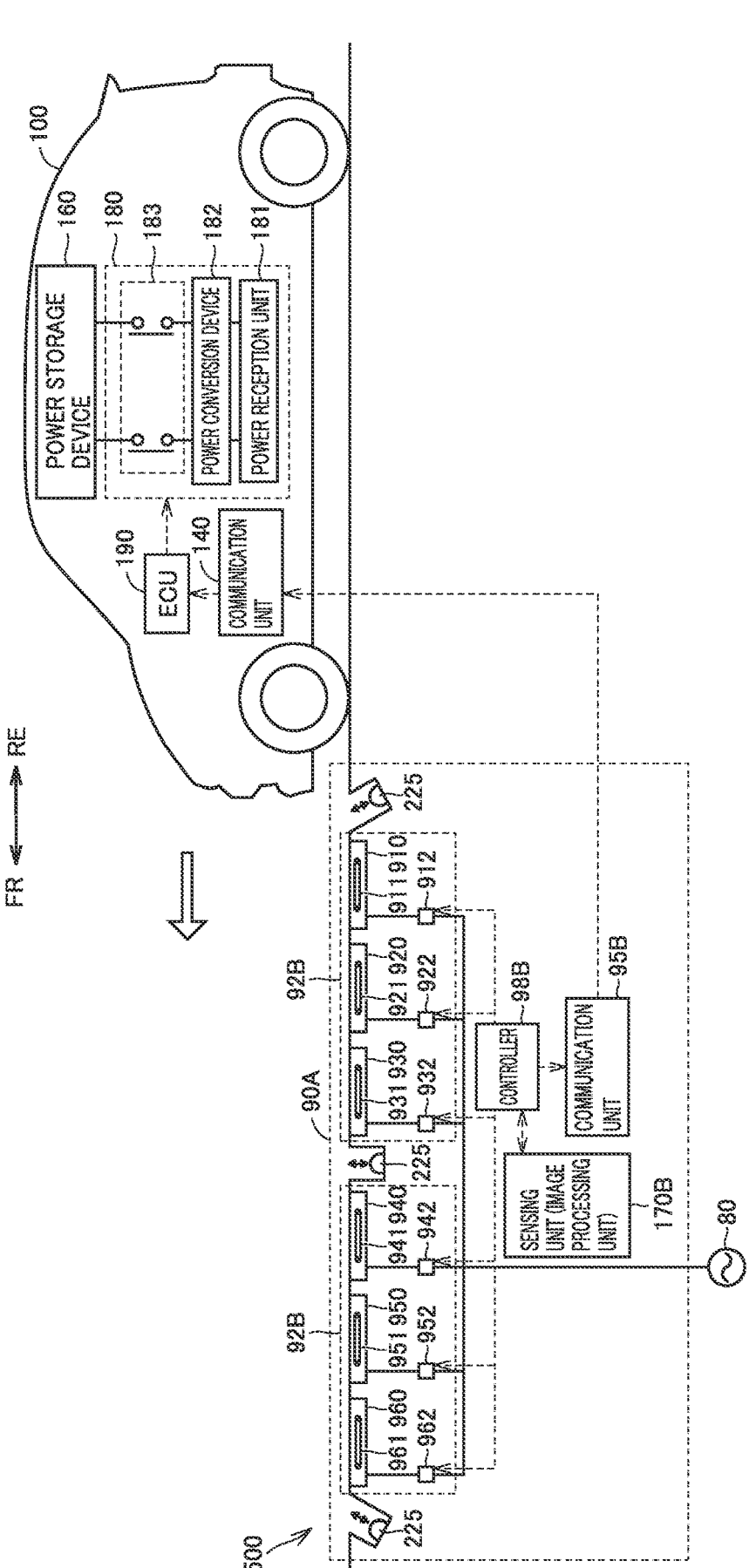
FIG. 10 is a diagram showing a state in which a camera for capturing an image used for setting a sensing region is provided in a charging lane.

FIG. 10 is a diagram showing the state in which a camera for capturing an image used for setting sensing region 400 is provided in charging lane 500. Referring to FIG. 10, charging lane 500 includes a camera 225 and a sensing unit (image processing unit) 170B in addition to the components shown in FIG. 4.

Each of cameras 225 is a fish-eye camera like cameras 121R, 121F, 122R, and 122L. Each camera 225 is connected to controller 98B through a signal line (not shown). Further, each camera 225 is connected to a drive mechanism (not shown). This drive mechanism is used to adjust the position (the depth) of each camera 225, similarly to drive mechanism 125. Each camera 225 captures an image of the region around vehicle 100. The image captured by each camera 225 (captured image) is used for setting sensing region 400B.

Similarly to sensing unit 170 (FIG. 1), sensing unit 170B senses sensing target 430 in the captured image when power transmission unit 92B transmits electric power to power reception unit 181.

By controlling the above-mentioned drive mechanism, controller 98B can adjust the position of each camera 225. Thereby, the area size of the region whose image is captured by each camera 225 is adjusted as in FIGS. 8 and 9. Accordingly, controller 98B can set sensing region 400B while adjusting the area size of sensing region 400B around vehicle 100. The memory of controller 98B stores a map indicating the correlation between the position (depth) of each camera 225 and the area size (area) of sensing region 400B. Controller 98B uses this map to adjust the position of each camera 225 to thereby adjust the area size of sensing region 400B. In this way, sensing region 400B may be set by controller 98B of power transmission device 90B in place of ECU 190 of vehicle 100.

Controller 98B can set sensing region 400B of power transmission unit 92B such that sensing region 400B of power transmission unit 92B is smaller than sensing region 400A of power transmission unit 92A for parking space 450. Controller 98B acquires the information indicating the area size of sensing region 400A of power transmission unit 92A from power transmission device 90A, for example, through communication unit 95B. Then, controller 98B can set sensing region 400B as described above in accordance with the information.

Controller 98B acquires an image captured by each camera 225 (captured image) through the above-mentioned signal line, and transmits the acquired image to sensing unit 170B. When sensing unit 170B senses sensing target 430 in the captured image (when sensing target 430 is sensed in sensing region 400B), controller 98B reduces the electric power transmitted from power transmission unit 92B. Specifically, controller 98B controls power supply circuits 912, 922, 932, 942, 952, and 962 so as to reduce the electric power transmitted from power transmission unit 92B.

Referring again to FIG. 6, camera 320 provided above charging lane 500 may capture an image used for setting sensing region 400B. Then, communication interface 325 transmits the image captured by each camera 320 to controller 98B (FIG. 10).

Controller 98B can set sensing region 400B of power transmission unit 92B such that sensing region 400B of power transmission unit 92B is smaller than sensing region 400A of power transmission unit 92A for parking space 450. In the example in FIG. 6, controller 98B is configured to remotely control, through communication unit 95B, the position (depth) of each camera 320 in the direction toward vehicle 100. Then, controller 98B can set sensing region 400B while adjusting the area size of sensing region 400B by adjusting the position of each camera 320.

The camera for capturing an image used for setting sensing region 400 may be provided in parking space 450.

Referring again to FIG. 7, a camera 330 provided in parking space 450 may be configured to capture an image used for setting sensing region 400A. Controller 98A then acquires the image captured by camera 330, and transmits the acquired image to sensing unit (image processing unit) 170A.

Sensing unit 170A serves as an image processing circuit having a function similar to that of sensing unit 170. Specifically, sensing unit 170A is configured to sense sensing target 430 in sensing region 400A set around vehicle 100 while power transmission unit 92A transmits electric power to power reception unit 181. Sensing unit 170A senses sensing target 430 in the captured image by applying an image processing technique to the image captured by camera 330 (captured image). Thereby, sensing target 430 in sensing region 400A set around vehicle 100 is sensed.

Controller 98A controls a drive mechanism (not shown) connected to camera 330 to thereby adjust the position of camera 330. Thereby, controller 98A can set sensing region 400A while adjusting the area size of sensing region 400A. The memory of controller 98A stores a map indicating a prescribed correlation between the position (depth) of camera 330 and the area size (area) of sensing region 400A. Controller 98A uses this map to adjust the position of camera

330 to thereby adjust the area size of sensing region 400A. In this way, sensing region 400A may be set by controller 98A of power transmission device 90A.

Controller 98A can set sensing region 400A of power transmission unit 92A such that sensing region 400A of power transmission unit 92A is larger than sensing region 400B of power transmission unit 92B for charging lane 500. Controller 98A acquires information indicating the area size of sensing region 400B of power transmission unit 92B from power transmission device 90B, for example, through communication unit 95A. Controller 98A can set sensing region 400A as described above in accordance with the information. When sensing unit 170A senses sensing target 430, controller 98A reduces the electric power transmitted from power transmission unit 92A.

Figure 11:
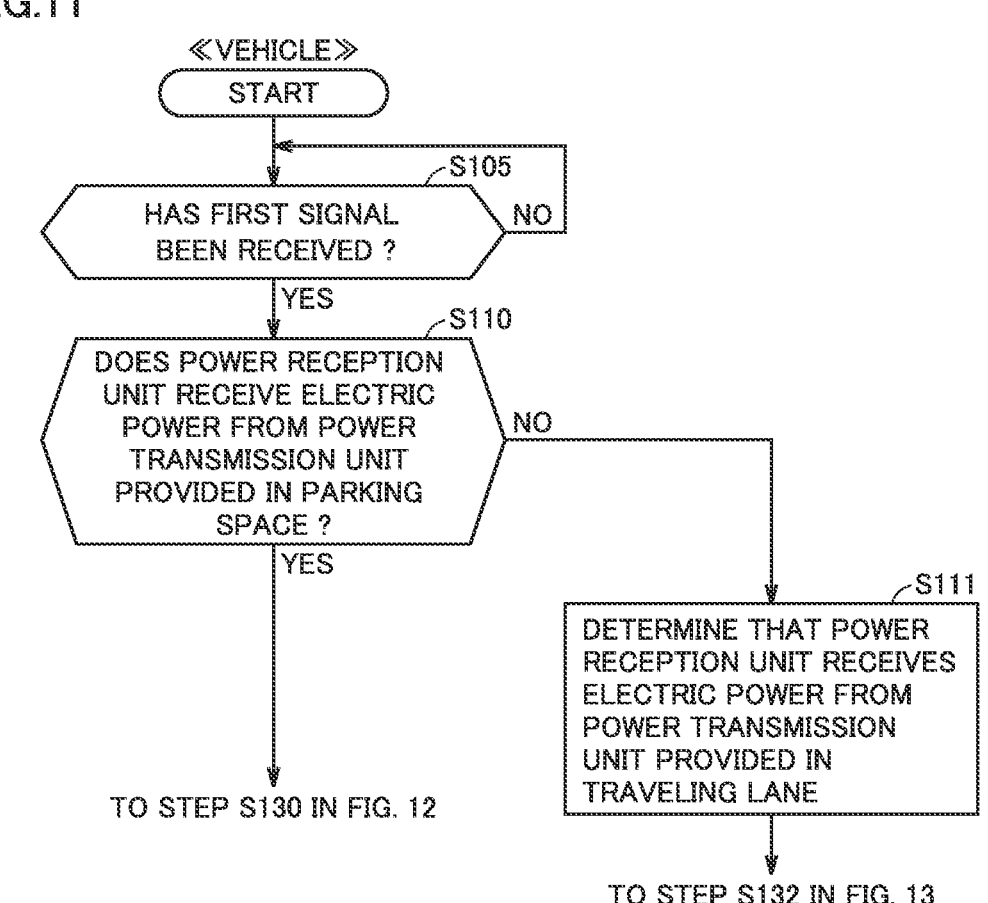
FIG. 11 is a flowchart for illustrating an example of a series of processes involved in wireless charging of a vehicle according to a first embodiment.
Figure 12:
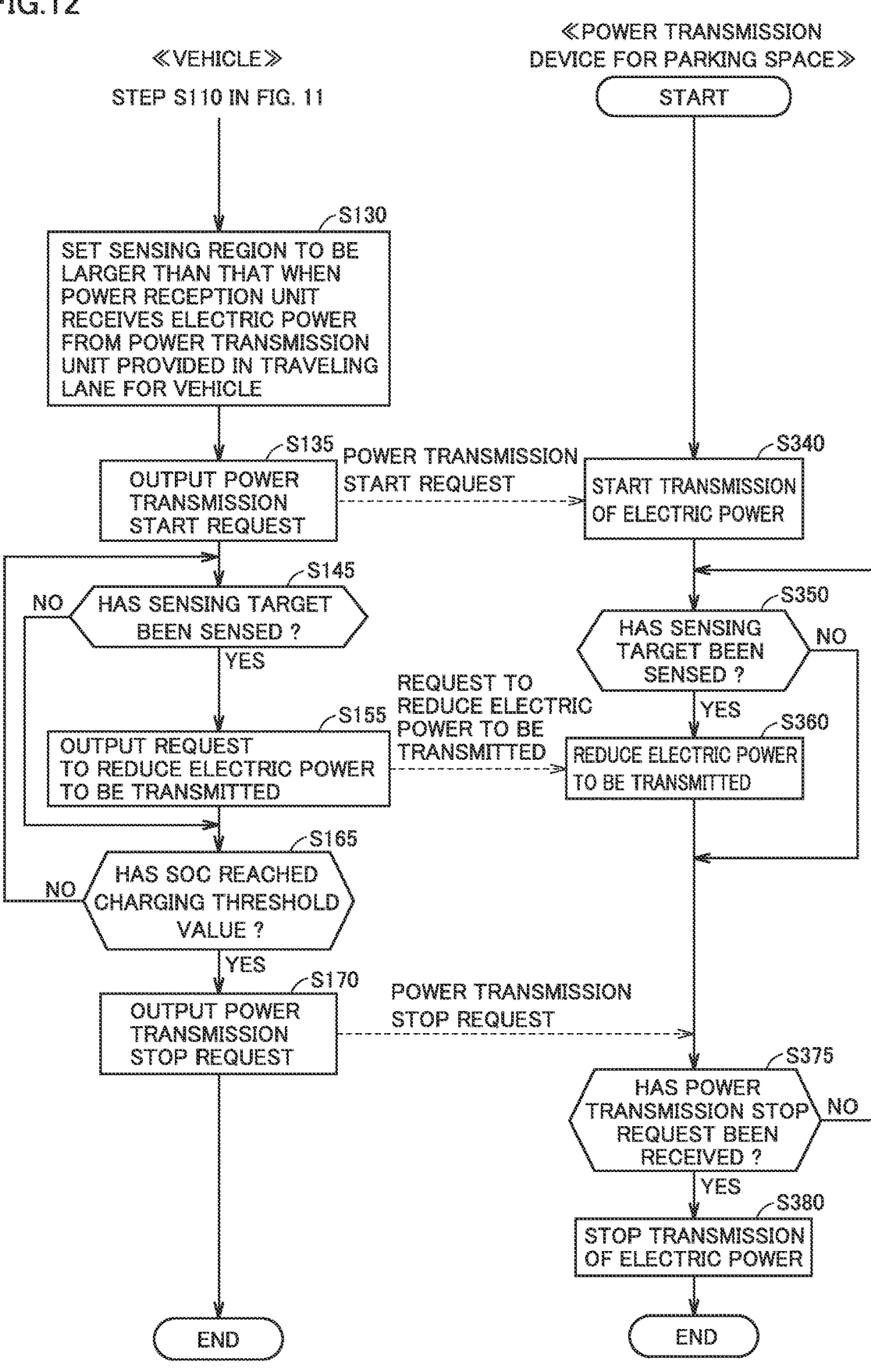
FIG. 12 is a flowchart for illustrating an example of the series of processes involved in wireless charging of the vehicle according to the first embodiment.
Figure 13:
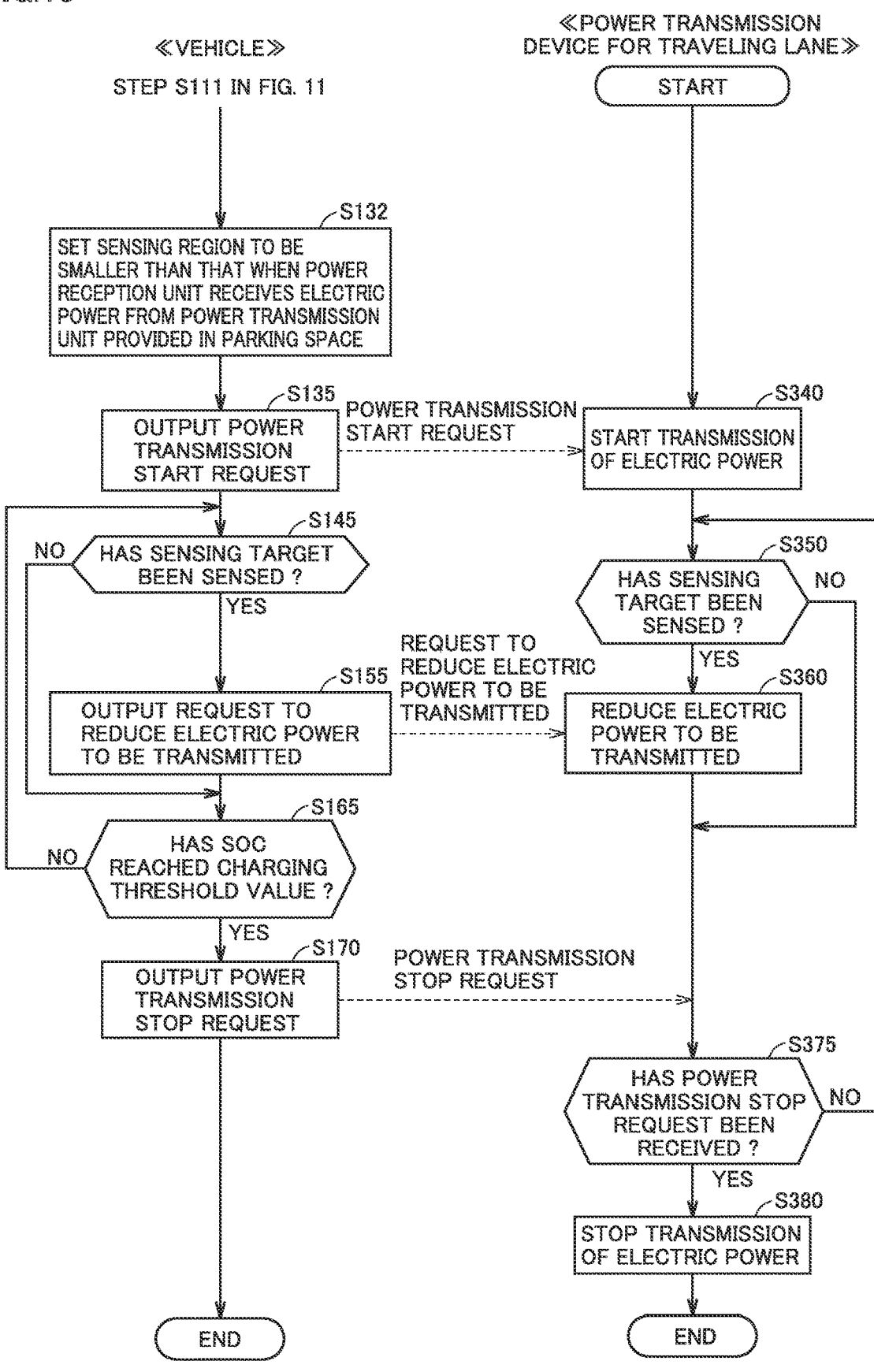
FIG. 13 is a flowchart for illustrating an example of the series of processes involved in wireless charging of the vehicle according to the first embodiment.

FIGS. 11, 12, and 13 each are a flowchart for illustrating an example of a series of processes involved in wireless charging of vehicle 100 according to the first embodiment. This series of processes (more specifically, the process in FIG. 11) is started when charging button 137 (FIG. 1) of vehicle 100 is turned on.

Referring to FIG. 11, ECU 190 of vehicle 100 determines whether or not the first signal of power transmission device 90A or 90B has been received from power transmission device 90A or 90B through communication unit 140 (step S105). When the first signal has not been received (NO in step S105), ECU 190 performs the above-described determination process until the first signal is received. On the other hand, when the first signal has been received (YES in step S105). ECU 190 shifts the process to step S110.

Then, ECU 190 determines whether or not power reception unit 181 receives electric power from power transmission unit 92A provided in parking space 450 (step S110). Specifically, based on the signal received through the short-range communication using communication unit 140, ECU 190 determines whether or not the source of the first signal is the power transmission device for parking space 450.

When ECU 190 determines that power reception unit 181 receives electric power from power transmission unit 92A (YES in step S110), ECU 190 shifts the process to step S130 in FIG. 12. On the other hand, when ECU 190 determines that power reception unit 181 does not receive electric power from power transmission unit 92A (NO in step S110), ECU 190 shifts the process to step S111. Then, ECU 190 determines that power reception unit 181 receives electric power from power transmission unit 92B provided in the traveling lane (charging lane 500) (step S111), and shifts the process to step S132 in FIG. 13.

FIG. 12 is a flowchart illustrating a process performed when wireless charging is performed using power transmission device 90A for parking space 450 (YES in step S110 in FIG. 11). In the present example, the sensing process for sensing target 430 is performed by both sensing unit 170 of vehicle 100 and sensing unit 170A of power transmission device 90A (FIG. 7).

Referring to FIG. 12, after step S110 in FIG. 11, ECU 190 sets sensing region 400 to be larger than that when power reception unit 181 receives electric power from power transmission unit 92B provided in the traveling lane (charging lane 500) for vehicle 100 (step S130). Specifically, ECU 190 sets sensing regions 400A and 400B such that sensing region 400A is larger than sensing region 400B.

Then, ECU 190 outputs a power transmission start request through communication unit 140 to power transmission device 90A for parking space 450 (step S135).

Then, upon receipt of the request through communication unit 95A, controller 98A of power transmission device 90A controls power transmission unit 92A to start transmission of electric power to power reception unit 181 (step S340). As a result, wireless charging of vehicle 100 is started.

Then, based on the signal from sensing unit 170A (FIG. 7), controller 98A determines whether or not sensing target 430 has been sensed in sensing region 400A (step S350). When sensing target 430 has not been sensed (NO in step S350), controller 98A shifts the process to step S375. On the other hand, when sensing target 430 has been sensed (YES in step S350), controller 98A shifts the process to step S360.

Based on the signal from sensing unit 170, ECU 190 of vehicle 100 determines whether or not sensing target 430 has been sensed in sensing region 400A (step S145). When sensing target 430 has not been sensed (NO in step S145), ECU 190 shifts the process to step S165. On the other hand, when sensing target 430 has been sensed (YES in step S145), ECU 190 outputs a request to power transmission device 90A to reduce the electric power transmitted from power transmission unit 92A (step S155).

Then, upon receipt of the request through communication unit 95A, controller 98A of power transmission device 90A controls power transmission unit 92A to reduce the electric power transmitted to power reception unit 181 (step S360). Thereby, the intensity of leakage electromagnetic field LEMF is reduced from I0 (FIG. 5) as default intensity to I1 (FIG. 7). Then, wireless charging is continued while the electric power transmitted from power transmission unit 92A is reduced. Then, the process proceeds to step S375.

ECU 190 of vehicle 100 determines whether or not the SOC of power storage device 160 has reached a charging threshold value (step S165). When the SOC has not reached the charging threshold value (NO in step S165). ECU 190 returns the process to step S145. On the other hand, when the SOC has reached the charging threshold value (YES in step S165), ECU 190 outputs a power transmission stop request to power transmission device 90A (step S170).

In step S375, controller 98A of power transmission device 90A determines whether or not it has received the power transmission stop request from vehicle 100 through communication unit 95A (step S375). When the power transmission stop request has not been received (NO in step S375), controller 98A returns the process to step S350. On the other hand, when the power transmission stop request has been received (YES in step S375), controller 98A controls power transmission unit 92A to stop transmission of electric power to power reception unit 181 (step S380). As a result, wireless charging of vehicle 100 ends, and then, a series of processes ends.

When sensing target 430 has no longer been sensed (NO in step S350) while controller 98A is not receiving the power transmission stop request (while it is determined as NO in step S375) after the electric power to be transmitted is reduced in step S360, then, controller 98A controls power transmission unit 92A such that the electric power transmitted from power transmission unit 92A is reset to the electric power before it is reduced.

FIG. 13 is a flowchart illustrating a process performed when wireless charging is performed using power transmission device 90B for charging lane 500 (NO in step S110 in FIG. 11). In the present example, the sensing process for sensing target 430 is performed by both sensing unit 170 of vehicle 100 and sensing unit 170B (FIG. 10) of power transmission device 90B.

Referring to FIG. 13, after step S111 in FIG. 11, ECU 190 of vehicle 100 sets sensing region 400 to be smaller than that when power reception unit 181 receives electric power from power transmission unit 92A provided in parking space 450

(step S132). In other words, ECU 190 sets sensing region 400B such that sensing region 400B is smaller than sensing region 400A.

The processes in steps S135 to S170 and steps S340 to S380 in FIG. 13 are basically the same as those in FIG. 12.

In the present example, ECU 190 outputs a power transmission start request (step S135), a request to reduce electric power to be transmitted (step S155), and a power transmission stop request (step S170) to power transmission device 90B in place of power transmission device 90A.

In place of the process of determining whether or not the SOC has reached the charging threshold value (step S165 in FIG. 13), ECU 190 may determine whether or not vehicle 100 has passed through charging lane 500. Specifically, ECU 190 performs this determination process based on whether or not the short-range communication between vehicle 100 and power transmission device 90B is disconnected. Then, when short-range communication is disconnected, ECU 190 determines that vehicle 100 has passed through charging lane 500, and then ends the process. Then, controller 98B of power transmission device 90B also ends the process. On the other hand, when the short-range communication is not disconnected (is still established), ECU 190 determines that vehicle 100 has not passed through (but is traveling on) charging lane 500, and returns the process to step S145.

As described above, in wireless power transfer system 10 according to the present embodiment, ECU 190 of vehicle 100 sets sensing region 400 to be larger when power reception unit 181 receives electric power from power transmission unit 92A than when power reception unit 181 receives electric power from power transmission unit 92B.

According to the configuration as described above, sensing target 430 is sensed more readily when power reception unit 181 receives electric power from power transmission unit 92A than when power reception unit 181 receives electric power from power transmission unit 92B. Thus, the electric power transmitted from power transmission unit 92A is reduced more readily than the electric power transmitted from power transmission unit 92B. As a result, the intensity of leakage electromagnetic field LEMF generated from power transmission unit 92A tends to be lower than the intensity of leakage electromagnetic field LEMF generated from power transmission unit 92B (the intensity tends to be lowered from I0 to I1). Thus, the influence exerted by leakage electromagnetic field LEMF upon electric device 380 around vehicle 100 can be reduced more when power reception unit 181 receives electric power from power transmission unit 92A than when power reception unit 181 receives electric power from power transmission unit 92B.

From a different point of view, the electric power transmitted from power transmission unit 92B is less readily reduced than the electric power transmitted from power transmission unit 92A. Thus, wireless charging (charging while traveling) is performed more satisfactorily when power reception unit 181 receives electric power from power transmission unit 92B than when power reception unit 181 receives electric power from power transmission unit 92A.

In the present embodiment, fish-eye cameras are used as cameras 121R, 121F, 122R, and 122L. The region whose image is captured by such a fish-eye camera is larger than the region whose image is captured by a normal camera. Accordingly, a fish-eye camera is suitable when ECU 190 sets sensing region 400A such that sensing region 400A is larger than sensing region 400B.

First Modification of First Embodiment

When sensing target 430 is sensed, as the distance between sensing target 430 and power transmission unit 92A or 92B that is transmitting electric power to vehicle 100 (the currently operating power transmission unit) is shorter, ECU 190 may more reduce electric power transmitted from this currently operating power transmission unit. ECU 190 calculates this distance by applying a known image processing technique to images captured by cameras 121R, 121F, 122L, and 122R. Then, ECU 190 transmits a command value of the electric power, which is transmitted depending on the distance, through communication unit 140 to the currently operating power transmission device. The program for the above-mentioned image processing is stored in memory 192.

The influence exerted upon electric device 380 by leakage electromagnetic field LEMF generated from the currently operating power transmission unit is larger as the distance between the power transmission unit (vehicle 100 aligned with the power transmission unit) and electric device 380 (sensing target 430 such as person 370 carrying electric device 380) is shorter.

According to the present first modification, even when the distance between the currently operating power transmission unit and electric device 380 is short, the electric power to be transmitted is reduced, so that an increase in intensity of leakage electromagnetic field LEMF is suppressed. Thereby, the influence of leakage electromagnetic field LEMF upon electric device 380 can be prevented from increasing.

Second Modification of First Embodiment

When sensing target 430 is sensed, ECU 190 may stop the power transmission unit (power transmission unit 92A or 92B) that is transmitting electric power to vehicle 100. Specifically, ECU 190 may output a power transmission stop request to this power transmission unit.

According to the present second modification, when sensing target 430 is sensed, generation of leakage electromagnetic field LEMF from the power transmission unit that has been transmitting electric power to vehicle 100 is stopped. As a result, electric device 380 can be prevented from being influenced by leakage electromagnetic field LEMF.

Third Modification of First Embodiment

Cameras 121R, 121F, 122R, and 122L may be thermo-cameras. When the temperature in a partial region in an image captured by a thermo-camera is higher than a prescribed temperature, sensing unit 170 senses a target in this partial region as sensing target 430. This makes it easy to sense a living body such as person 370 as sensing target 430.

Cameras 121R, 121F, 122R, and 122L may be infrared cameras. Thus, sensing unit 170 can sense sensing target 430 even when no lighting device is used at night.

Fourth Modification of First Embodiment

In the first embodiment and the first to third modifications as described above, ECU 190 uses drive mechanism 125 to adjust the positions of cameras 121R, 121F, 122R, and 122L, to thereby set sensing region 400 (400A and 400B).

On the other hand, ECU 190 may set a target region for image processing (image processing region) in the image captured by each camera in accordance with the position where wireless charging is performed. More specifically, ECU 190 sets the size of the above-mentioned image processing region depending on the positon where wireless charging is performed.

For example, ECU 190 sets the image processing region such that the image processing region in the captured image is larger when wireless charging is performed in parking space 450 than when wireless charging is performed on charging lane 500. Sensing unit 170 performs a sensing process (image processing) in the set image processing region.

As an example, when wireless charging is performed in parking space 450, the entire region of the captured image is set as an image processing region, and sensing target 430 is sensed in this entire region. On the other hand, when wireless charging is performed on charging lane 500, only a partial region (for example, a central region) of the captured image is set as an image processing region, and sensing target 430 is sensed only in this partial region. Accordingly, even when sensing target 430 is present in a region different from this partial region in the captured image, sensing target 430 is not sensed.

As described above, in the present fourth modification, the image processing region is set depending on the position where wireless charging is performed. This enables setting of sensing region 400 while adjusting the area size of sensing region 400. This allows sensing region 400A to be larger than sensing region 400B. Thus, drive mechanism 125 (FIG. 1) is not indispensable for setting (changing) sensing region 400. As a result, cost increase resulting from increased number of components in vehicle 100 can be suppressed.

Fifth Modification of First Embodiment

In the first embodiment and the first to third modifications as described above, sensing target 430 is sensed using image capturing unit 120 and sensing unit 170. In this regard, sensor unit 110 may function as a "sensing unit" in the present disclosure. Specifically, sensing target 430 may be sensed using ultrasonic sensor 112 or optical sensor 114 of sensor unit 110.

For example, when ultrasonic sensor 112 is used, four ultrasonic sensors 112 (also referred to as first, second, third, and fourth ultrasonic sensors) are used to sense sensing target 430 in directions FR, RE, RI, and LE (all of which are shown in FIG. 3). Each ultrasound sensor 112 includes a set of a transmitter and a receiver.

Further, ECU 190 sets a sensing threshold value for each ultrasonic sensor 112. Specifically, when the reception intensity of the reflected wave that is transmitted from the transmitter and reflected by sensing target 430 is equal to or greater than the sensing threshold value, ultrasonic sensor 112 senses sensing target 430. The result of sensing of sensing target 430 is output from each ultrasonic sensor 112 to ECU 190.

ECU 190 sets the sensing threshold value to be smaller when wireless charging is performed in parking space 450 than when wireless charging is performed on charging lane 500.

Typically, as sensing target 430 is farther away from vehicle 100, the reception intensity of the reflected wave that is transmitted from the transmitter and reflected by sensing target 430 is lower. Thus, as the sensing threshold value is lower, each ultrasonic sensor 112 can sense sensing target 430 that is located farther away from vehicle 100.

ECU 190 sets the sensing threshold value as described above, and thereby, sensing region 400A can be set to be larger than sensing region 400B. In this way, when ultrasonic sensor 112 is used to sense sensing target 430, sensing target 430 can be sensed irrespective of the color of sensing target 430 and the brightness around vehicle 100.

When sensing target 430 is sensed by sensor unit 110 serving as a sensing unit, ECU 190 reduces the electric power transmitted from power transmission unit 92A or 92B that is transmitting electric power to vehicle 100.

It is preferable that ECU 190 sets a sensing threshold value for each ultrasonic sensor 112 such that sensing region 400A is larger in width than sensing region 400B in the lateral direction (directions LE and RI) of vehicle 100. Specifically, it is preferable that ECU 190 sets each sensing threshold value such that the sensing threshold value of each of the third and fourth ultrasonic sensors (in directions LE and RI) is lower than the sensing threshold value of each of the first and second ultrasonic sensors (in directions FR and RE).

Similarly, optical sensor 114 may be used to sense sensing target 430. In this case, four optical sensors 114 (which will be also referred to as first, second, third, and fourth optical sensors) used to sense sensing target 430 in directions FR, RE, RI, and LE are used. ECU 190 sets a sensing threshold value for each optical sensor 114 as in the case of ultrasonic sensor 112. For example, ECU 190 sets each sensing threshold value such that the sensing threshold value of each of the third and fourth optical sensors (in directions LE and RI) is lower than the sensing threshold value of each of the first and second optical sensors (in directions FR and RE).

Typically, optical sensor 114 is more excellent in sensing accuracy and responsiveness than ultrasound sensor 112. As described above, when optical sensor 114 is used to sense sensing target 430, the sensing accuracy and the responsiveness both can be more enhanced than when ultrasound sensor 112 is used.

Sixth Modification of First Embodiment

Sensing unit 170 and ECU 190 may be integrally configured. For example, the function of sensing unit 170 may be implemented by software processing in ECU 190. Specifically, when a program for implementing the function of sensing unit 170 is stored in memory 192 of ECU 190, CPU 191 executes the program to thereby implement the function (image processing function) of sensing unit 170. Thus, sensing unit 170 is not necessarily limited to an image processing circuit separate from ECU 190.

Second Embodiment

In the first embodiment, ECU 190 of vehicle 100 mainly sets sensing region 400 (sensing regions 400A and 400B). Alternatively, processing unit 230 of server 200 (FIG. 1) may set sensing region 400, which will be hereinafter described in detail.

Figure 14:
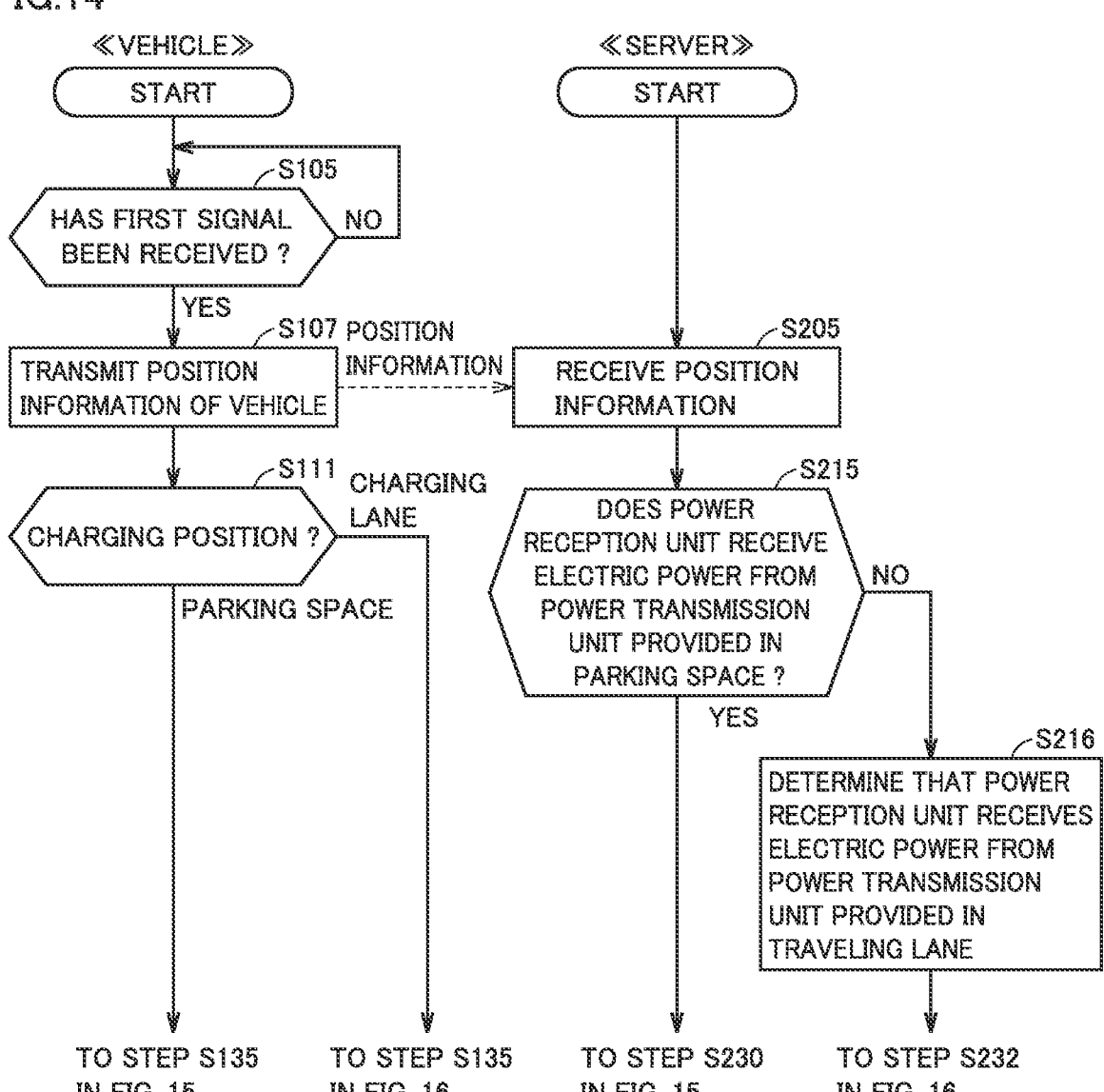
FIG. 14 is a flowchart for illustrating an example of a series of processes involved in wireless charging of a vehicle according to a second embodiment.
Figure 15:
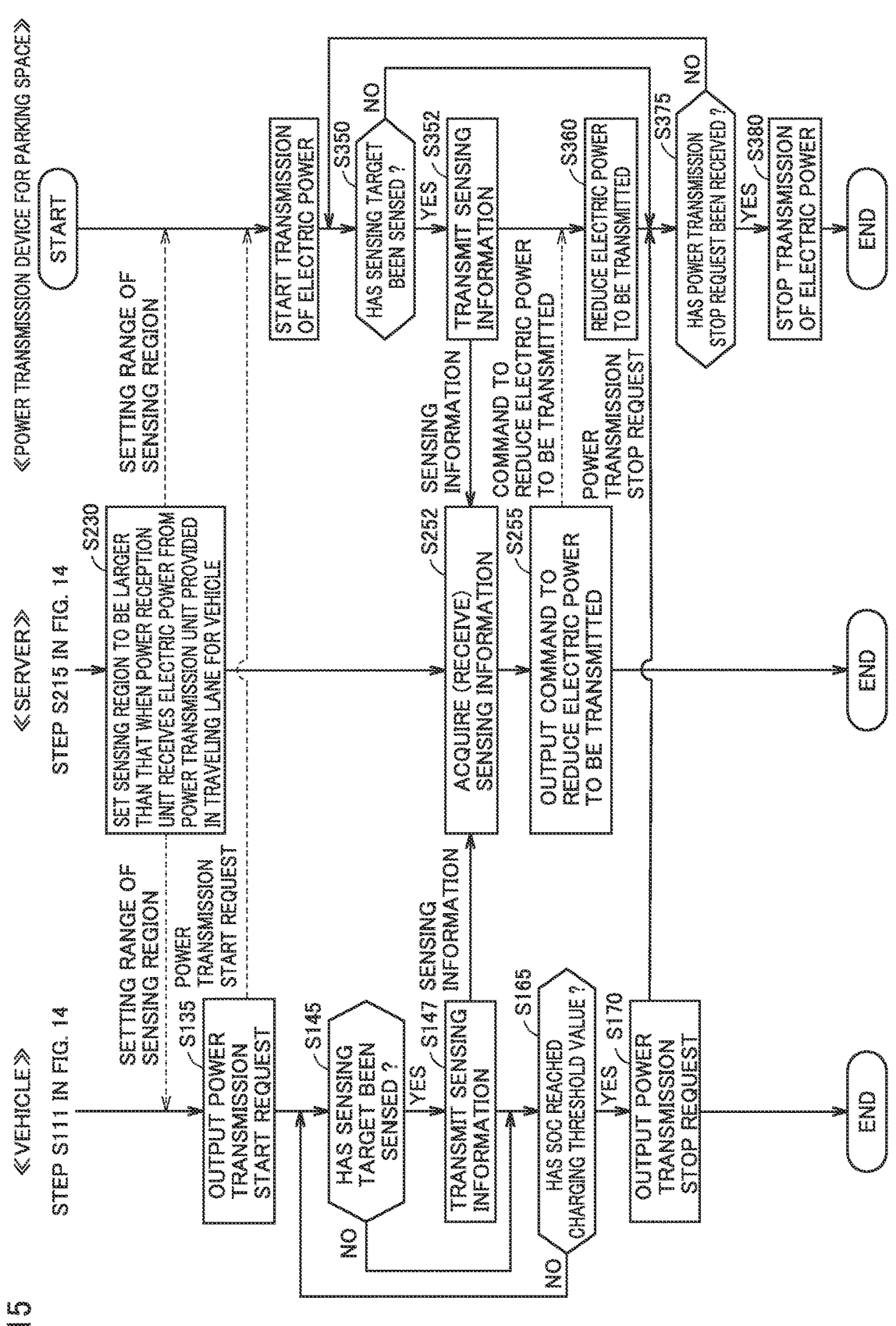
FIG. 15 is a flowchart for illustrating an example of the series of processes involved in wireless charging of the vehicle according to the second embodiment.
Figure 16:
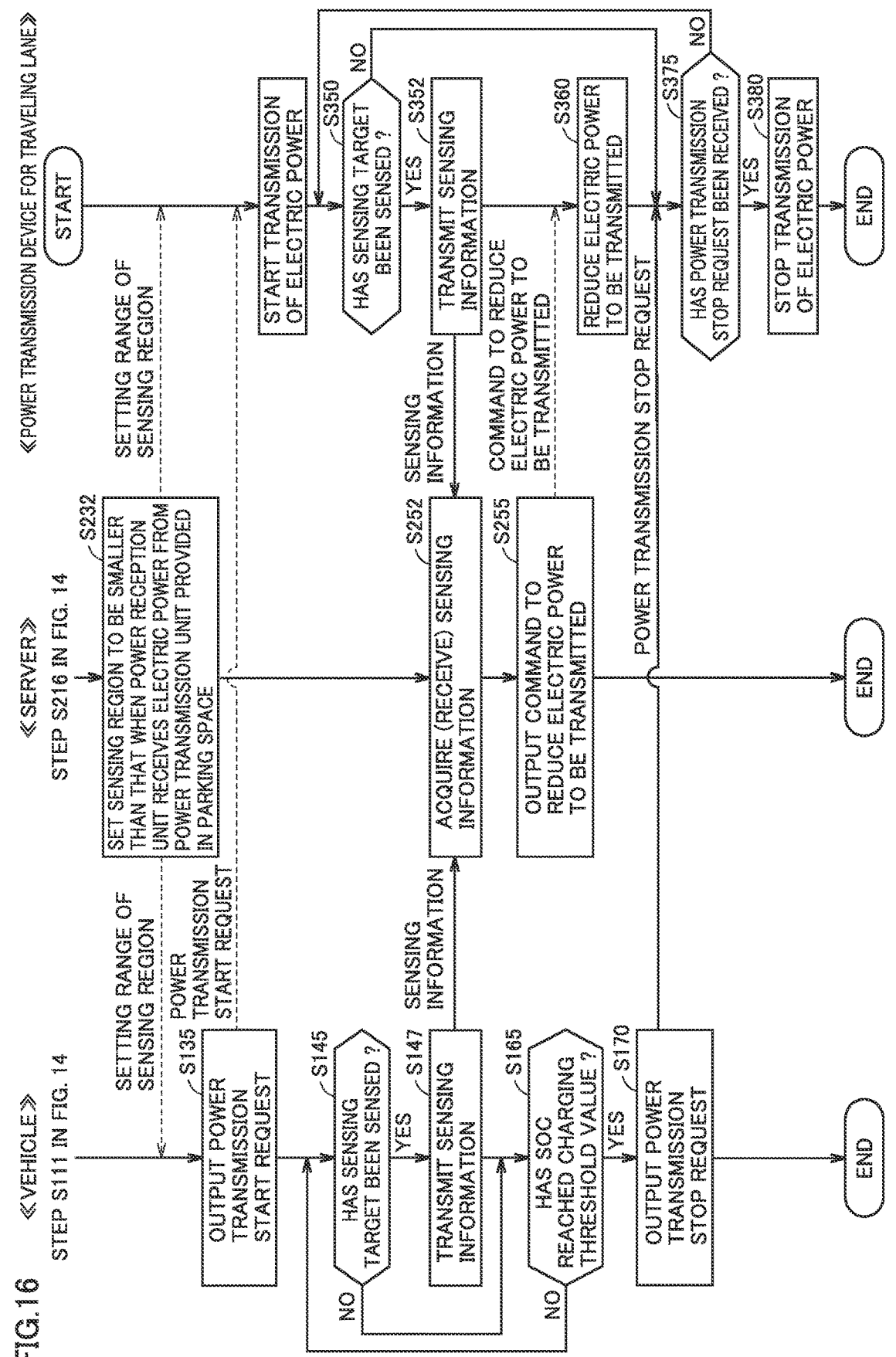
FIG. 16 is a flowchart for illustrating an example of the series of processes involved in wireless charging of the vehicle according to the second embodiment.

FIGS. 14, 15, and 16 each are a flowchart for illustrating an example of a series of processes involved in wireless charging of vehicle 100 according to the second embodiment. This series of processes (more specifically, the process in FIG. 14) is started when charging button 137 (FIG. 1) of vehicle 100 is turned on. The following description refers to FIGS. 11 to 13 as appropriate.

Referring to FIG. 14, when ECU 190 of vehicle 100 receives the first signal (YES in step S105), ECU 190 transmits position information (vehicle information) of vehicle 100 to server 200 through communication unit 140 (step S107). The process in vehicle 100 then proceeds to step S11.

When processing unit 230 of server 200 receives the position information from vehicle 100 through communication unit 210 (step S205), the process proceeds to step S215.

Then, processing unit 230 determines whether or not power reception unit 181 receives electric power from power transmission unit 92B provided in parking space 450 (step S215). Specifically, processing unit 230 identifies the power transmission device provided at the current position of vehicle 100 from among a plurality of power transmission devices registered in power transmission device information DB 221 stored in storage unit 220. From power transmission device information DB 221, processing unit 230 acquires information indicating whether the identified power transmission device is power transmission device 90A for parking space 450 or power transmission device 90B for charging lane 500. Then, processing unit 230 performs the above-mentioned determination process in accordance with the acquired information.

When processing unit 230 determines that power reception unit 181 receives electric power from power transmission unit 92B provided in parking space 450 (YES in step S215), processing unit 230 shifts the process to step S230 in FIG. 15. On the other hand, when processing unit 230 determines that power reception unit 181 does not receive electric power from power transmission unit 92B provided in parking space 450 (NO in step S215), it determines that power reception unit 181 receives electric power from power transmission unit 92B provided in the traveling lane (charging lane 500) (step S216), and then, shifts the process to step S232 in FIG. 16.

ECU 100 of vehicle 100 determines whether the charging position for wireless charging is parking space 450 or charging lane 500 (step S111). Specifically, based on the signal received through short-range communication, ECU 100 determines whether the source of the first signal received in step S105 is power transmission device 90A for parking space 450 or power transmission device 90B for charging lane 500. When the charging position is parking space 450, ECU 100 shifts the process to step S135 in FIG. 15. On the other hand, when the charging position is charging lane 500, ECU 100 shifts the process to step S135 in FIG. 16.

FIG. 15 is a flowchart illustrating a process performed when wireless charging is performed using power transmission device 90A for parking space 450 (when the charging position is parking space 450 in step S111 in FIG. 11). This flowchart is different from the flowchart in FIG. 12 in that processing unit 230 of server 200 in place of ECU 190 of vehicle 100 sets sensing region 400.

Specifically, in the flowchart in FIG. 15, the processes in steps S230 and S255 correspond to the processes in steps S130 and S155, respectively (both of which are shown in FIG. 12). Further, the flowchart in FIG. 13 additionally includes the processes of steps S147, S252, and S352 as compared with the flowchart in FIG. 12. Other processes in FIG. 15 are basically the same as those in FIG. 12.

In the present example, the sensing process for sensing target 430 is performed by both sensing unit 170 of vehicle 100 and sensing unit 170A of power transmission device 90A (FIG. 7).

Referring to FIG. 15, after step S215 in FIG. 14, processing unit 230 of server 200 sets sensing region 400 to be larger than that when power reception unit 181 receives electric power from power transmission unit 92B provided in the traveling lane (charging lane 500) for vehicle 100 (step S230). Specifically, processing unit 230 sets sensing regions 400A and 400B such that sensing region 400A is larger than sensing region 400B. Processing unit 230 transmits signals indicating the setting range of sensing region 400 to vehicle 100 and power transmission device 90A through communication unit 210. More specifically, processing unit 230 transmits the command values about the position (depth) of each camera in each recess such as recess 125R to vehicle 100 and power transmission device 90A.

When ECU 190 of vehicle 100 determines that sensing target 430 has been sensed in sensing region 400A (YES in step S145), ECU 190 transmits sensing information to server 200 through communication unit 140 (step S147). The sensing information indicates that sensing target 430 has been sensed by sensing unit 170 and also indicates the position of sensing target 430.

Similarly, when controller 98A of power transmission device 90A determines that sensing target 430 has been sensed in sensing region 400A (YES in step S350), controller 98A transmits sensing information to server 200 through communication unit 95A (step S352). This sensing information indicates that sensing target 430 has been sensed by sensing unit 170A and also indicates the position of sensing target 430.

Then, communication unit 210 of server 200 acquires (receives) the sensing information (step S252). When communication unit 210 acquires the sensing information, processing unit 230 outputs a command to power transmission device 90A through communication unit 210 to reduce the electric power transmitted from power transmission device 90A (power transmission unit 92A).

FIG. 16 is a flowchart illustrating a process performed when wireless charging is performed using power transmission device 90B for charging lane 500 (when the charging position is charging lane 500 in step S111 in FIG. 11).

This flowchart is different from the flowchart in FIG. 13 in that processing unit 230 of server 200 in place of ECU 190 of vehicle 100 sets sensing region 400. Specifically, in the flowchart in FIG. 16, the processes of steps S232 and S255 correspond to the processes of steps S132 and S155, respectively (both of which are shown in FIG. 13). Further, the flowchart in FIG. 16 additionally includes processes of steps S147, S252, and S352 as compared with the flowchart in FIG. 13. Other processes in FIG. 16 are basically the same as those in FIG. 13.

Referring to FIG. 16, after step S216 in FIG. 14, processing unit 230 of server 200 sets sensing region 400 to be smaller than that when power reception unit 181 receives electric power from power transmission unit 92A provided in parking space 450 (step S232). Specifically, processing unit 230 sets sensing region 400B such that sensing region 400B is smaller than sensing region 400A. Processing unit 230 transmits the signals indicating the setting range of sensing region 400 to vehicle 100 and power transmission device 90B through communication unit 210.

As described above, server 200 according to the present embodiment includes communication unit 210 and processing unit (controller) 230. Communication unit 210 acquires sensing information indicating that sensing target 430 has been sensed by sensing unit 170. When communication unit 210 acquires the sensing information, processing unit 230 reduces the electric power transmitted from power transmission unit 92A or 92B that is transmitting electric power to vehicle 100. Processing unit 230 sets sensing region 400 to be larger when power reception unit 181 receives electric power from power transmission unit 92A than when power reception unit 181 receives electric power from power transmission unit 92B.

According to the configuration as described above, the same advantages as those in the first embodiment can also be achieved. Specifically, the influence exerted upon electric device 380 by leakage electromagnetic field LEMF in parking space 450 can be reduced. Further, wireless charging (charging while traveling) of vehicle 100 on charging lane 500 can be readily satisfactorily performed.

First Modification of Second Embodiment

When sensing target 430 has been sensed, as the distance between sensing target 430 and power transmission unit 92A or 92B that is transmitting electric power to vehicle 100 (the currently operating power transmission unit) is shorter, processing unit 230 may more reduce electric power transmitted from this currently operating power transmission unit. Specifically, processing unit 230 may calculate this distance based on the position information (vehicle information) of vehicle 100 and the sensing information and transmit a command value of the electric power, which depends on this distance, to the currently operating power transmission device through communication unit 210.

Thus, as in the first modification of the first embodiment, the influence of leakage electromagnetic field LEMF upon electric device 380 can be prevented from increasing.

Second Modification of Second Embodiment

When sensing target 430 has been sensed, processing unit 230 may stop power transmission unit 92A or 92B that is transmitting electric power to vehicle 100. Specifically, processing unit 230 may transmit a stop command to the currently operating power transmission device through communication unit 210.

Thereby, as in the second modification of the first embodiment, electric device 380 can be prevented from being influenced by leakage electromagnetic field LEMF.

Other Modifications

Processing unit 230 of server 200 may set sensing region 400 based on the frequency at which person 370 gets into and out of vehicle 100 in the area where wireless charging is performed. In the present example, for each of the divided areas in map information DB 222 (FIG. 1), storage unit 220 of server 200 stores the frequency at which person 370 gets into and out of vehicle 100 in a corresponding one of the areas. This frequency is determined in advance appropriately by experiments or the like.

In the following description, the first area is assumed to be a predetermined area where the frequency at which person 370 gets into and out of vehicle 100 is higher than that in the second area. As an example, the first area is an urban area and the second area is a rural area.

Upon receipt of the position information of vehicle 100 through communication unit 210, processing unit 230 determines the area where vehicle 100 is located based on map information DB 222. In the present example, vehicle 100 is located in the first area, and the power transmission unit (power transmission unit 92A or 92B) transmits electric power to power reception unit 181 in the first area. Then, processing unit 230 acquires the above-mentioned frequency in the first area from storage unit 220. In the present example, processing unit 230 sets sensing region 400 to be larger than that when the power transmission unit transmits electric power to power reception unit 181 in the second area.

Alternatively, ECU 190 of vehicle 100 may set sensing region 400 to be larger when the power transmission unit (power transmission unit 92A or 92B) transmits electric power to power reception unit 181 in the first area than when the power transmission unit transmits electric power to power reception unit 181 in the second area. Specifically, based on the map information stored in navigation system 135 of vehicle 100, ECU 190 determines the area (for example, which one of the first area or the second area) where vehicle 100 is located. Then, ECU 190 accesses server 200 through communication unit 170 to thereby acquire, from storage unit 220, the above-mentioned frequency in the area where vehicle 100 is currently located. Thereby, ECU 190 can set sensing region 400 as described above.

Alternatively, controller 98A of power transmission device 90A may set sensing region 400A to be larger when power transmission unit 92A transmits electric power to power reception unit 181 in the first area than when power transmission unit 92A transmits electric power to power reception unit 181 in the second area.

Alternatively, controller 98B of power transmission device 90B may set sensing region 400B to be larger when power transmission unit 92B transmits electric power to power reception unit 181 in the first area than when power transmission unit 92B transmits electric power to power reception unit 181 in the second area.

Although the present disclosure has been described and illustrated in detail, it is clearly understood that the same is by way of illustration and example only and is not to be taken by way of limitation, the scope of the present disclosure being interpreted by the terms of the appended claims.

What is claimed is:

1. A wireless power transfer system comprising:
a first power transmission device provided in a parking space, the first power transmission device including a first power transmission unit, and a first communication unit that transmits a first signal indicating that the first power transmission unit is provided in the parking space;
a second power transmission device provided in a traveling lane for a vehicle, the second power transmission device including a second power transmission unit, and a second communication unit that transmits a second signal indicating that the second power transmission unit is provided in the traveling lane;
a power reception unit that wirelessly receives electric power from the first power transmission unit or the second power transmission unit;
an onboard communication unit that receives the first signal from the first communication unit, or the second signal from the second communication unit;
a sensing unit that senses a sensing target in a sensing region set around the vehicle when the power reception unit receives electric power from the first power transmission unit or the second power transmission unit; and
a controller that, when the sensing unit senses the sensing target, reduces electric power transmitted from the first power transmission unit or the second power transmission unit that is transmitting electric power to the vehicle the controller determining whether the power reception unit receives electric power from the first power transmission unit or the second power transmission unit, in accordance with whether the onboard communication receives the first signal or the second signal, wherein
when the onboard communication unit receives the first signal, and the power reception unit receives electric power from the first power transmission unit, the controller sets the sensing region to be larger than when the onboard communication unit receives the second signal, and the power reception unit receives electric power from the second power transmission unit.

2. The wireless power transfer system according to claim 1, wherein, when the sensing target is sensed, the controller further reduces electric power transmitted from the first power transmission unit or the second power transmission unit that is transmitting electric power to the vehicle as a distance between the sensing target and the first power transmission unit or the second power transmission unit that is transmitting electric power to the vehicle is shorter.

3. The wireless power transfer system according to claim 1, wherein, when the sensing target is sensed, the controller stops the first power transmission unit or the second power transmission unit that is transmitting electric power to the vehicle.

4. A vehicle comprising:
a power reception unit that wirelessly receives electric power from a first power transmission device provided in a parking space or a second power transmission device provided in a traveling lane for a vehicle, the first power transmission device including a first power transmission unit, and a first communication unit that transmits a first signal indicating that the first power transmission unit is provided in the parking space, the second power transmission device including a second power transmission unit, and a second communication unit that transmits a second signal indicating that the second power transmission unit is provided in the traveling lane;
an onboard communication unit that receives the first signal from the first communication unit, or the second signal from the second communication unit; and
a controller that, when a sensing unit senses a sensing target in a sensing region set around the vehicle, reduces electric power transmitted from the first power transmission unit or the second power transmission unit that is transmitting electric power to the vehicle, the controller determining whether the power reception unit receives electric power from the first power transmission unit or the second power transmission unit, in accordance with whether the onboard communication receives the first signal or the second signal, wherein
the sensing unit senses the sensing target when the power reception unit receives electric power from the first power transmission unit or the second power transmission unit, and
when the onboard communication unit receives the first signal, and the power reception unit receives electric power from the first power transmission unit, the controller sets the sensing region to be larger than when the onboard communication unit receives the second signal, and the power reception unit receives electric power from the second power transmission unit.

5. The vehicle according to claim 4, wherein, when the sensing target is sensed, the controller further reduces electric power transmitted from the first power transmission unit or the second power transmission unit that is transmitting electric power to the vehicle as a distance between the sensing target and the first power transmission unit or the second power transmission unit that is transmitting electric power to the vehicle is shorter.

6. The vehicle according to claim 4, wherein, when the sensing target is sensed, the controller stops the first power transmission unit or the second power transmission unit that is transmitting electric power to the vehicle.

7. A server of a system including a first power transmission device provided in a parking space, a second power transmission device provided in a traveling lane for a vehicle, a power reception unit that wirelessly receives electric power from the first power transmission device or the second power transmission device, an onboard device that transmits position information of the vehicle, and a sensing unit that senses a sensing target in a sensing region set around the vehicle when the power reception unit receives electric power from the first power transmission device or the second power transmission device, the server comprising:

an acquisition unit that acquires sensing information indicating that the sensing unit senses the sensing target;

a storage unit that stores a database including first information indicating position of a plurality of power transmission devices including the first power transmission device and the second power transmission device, and second information indicating whether each of the plurality of power transmission devices is provided in a parking space or in a traveling lane; and a controller that, when the acquisition unit acquires the sensing information, reduces electric power transmitted from the first power transmission unit or the second power transmission unit that is transmitting electric power to the vehicle, wherein the controller determines, based on the position information transmitted from the vehicle, by using the database, whether the power transmission unit receives electric power from the first power transmission device or the second power transmission device, and when the controller determines the power reception unit receives electric power from the first power transmission unit, the controller sets the sensing region to be larger than when the controller determines the power reception unit receives electric power from the second power transmission unit.

8. The server according to claim 7, wherein, when the sensing target is sensed, the controller further reduces electric power transmitted from the first power transmission unit or the second power transmission unit that is transmitting electric power to the vehicle as a distance between the sensing target and the first power transmission unit or the second power transmission unit that is transmitting electric power to the vehicle is shorter.

9. The server according to claim 7, wherein, when the sensing target is sensed, the controller stops the first power transmission unit or the second power transmission unit that is transmitting electric power to the vehicle.

* * * * *